United States Patent
Aldana et al.

(10) Patent No.: US 11,784,861 B2
(45) Date of Patent: Oct. 10, 2023

(54) CHANNEL ACCESS RELATED ENHANCEMENTS TO NEW RADIO UNLICENSED (NR-U)

(71) Applicant: Intel Corporation, Santa Clara, CA (US)

(72) Inventors: Carlos H. Aldana, Santa Clara, CA (US); Salvatore Talarico, Sunnyvale, CA (US); Yingyang Li, Beijing (CN); Yongjun Kwak, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 17/174,184

(22) Filed: Feb. 11, 2021

(65) Prior Publication Data

US 2021/0194740 A1  Jun. 24, 2021

Related U.S. Application Data

(60) Provisional application No. 63/006,423, filed on Apr. 7, 2020, provisional application No. 62/989,069, filed on Mar. 13, 2020, provisional application No. 62/975,959, filed on Feb. 13, 2020.

(51) Int. Cl.
| | |
|---|---|
| *H04L 27/26* | (2006.01) |
| *H04W 72/04* | (2023.01) |
| *H04W 72/14* | (2009.01) |
| *H04W 72/12* | (2023.01) |
| *H04W 16/14* | (2009.01) |
| *H04W 72/1268* | (2023.01) |
| *H04W 72/23* | (2023.01) |

(52) U.S. Cl.
CPC ......... *H04L 27/2607* (2013.01); *H04W 16/14* (2013.01); *H04W 72/1215* (2013.01); *H04W 72/1268* (2013.01); *H04W 72/23* (2023.01)

(58) Field of Classification Search
CPC .............. H04L 27/2607; H04W 16/14; H04W 72/1215; H04W 72/1268; H04W 72/23; H04W 74/0808
USPC ......................................... 370/329–330, 336
See application file for complete search history.

(56) References Cited

U.S. PATENT DOCUMENTS

| | | | |
|---|---|---|---|
| 2019/0306923 A1* | 10/2019 | Xiong ................ | H04J 13/0062 |
| 2021/0105812 A1* | 4/2021 | Rastegardoost .......... | H04L 1/08 |
| 2021/0345407 A1* | 11/2021 | Myung ................ | H04L 5/0094 |

(Continued)

OTHER PUBLICATIONS

3GPP, "3rd Generation Partnership Project; Technical Specification Group Radio Access Network; Study on NR-based access to unlicensed spectrum (Release 16)", 3GPP TR 38.889 V16.0.0, Dec. 2018, 119 pages.

(Continued)

*Primary Examiner* — Candal Elpenord
(74) *Attorney, Agent, or Firm* — Schwabe, Williamson & Wyatt, P.C.

(57) ABSTRACT

Various embodiments herein provide techniques for wireless communication on New Radio unlicensed (NR-U) spectrum. For example, embodiments include techniques for a new listen-before-talk type and associated measurement window. Additionally, embodiments include techniques for determination of a cyclic prefix (CP) extension for an uplink transmission, such as a configured grant transmission or a dynamically scheduled transmission. Other embodiments may be described and claimed.

19 Claims, 7 Drawing Sheets

(56) References Cited

U.S. PATENT DOCUMENTS

2022/0174736 A1\* 6/2022 Oviedo ................ H04L 5/0053
2022/0330338 A1\* 10/2022 Karaki ............. H04W 74/0866

OTHER PUBLICATIONS

3GPP, "3rd Generation Partnership Project; Technical Specification Group Radio Access Network; Physical layer procedures for shared spectrum channel access (Release 16)", 3GPP TS 37.213 V16.0.0, Dec. 2019, 25 pages.

3GPP, "3rd Generation Partnership Project; Technical Specification Group Radio Access Network; NR; Multiplexing and channel coding (Release 16)", 3GPP TS 38.212 V16.0.0, Dec. 2019, 145 pages.

\* cited by examiner

CHANNEL ACCESS RELATED ENHANCEMENTS TO NEW RADIO UNLICENSED (NR-U)

CROSS REFERENCE TO RELATED APPLICATION

The present application claims priority to U.S. Provisional Patent Application No. 62/975,959, which was filed Feb. 13, 2020; U.S. Provisional Patent Application No. 62/989,069, which was filed Mar. 13, 2020; and U.S. Provisional Patent Application No. 63/006,423, which was filed Apr. 7, 2020; the disclosures of which are hereby incorporated by reference.

FIELD

Embodiments relate generally to the technical field of wireless communications.

BACKGROUND

Each year, the number of mobile devices connected to wireless networks significantly increases. In order to keep up with the demand in mobile data traffic, necessary changes have to be made to system requirements to be able to meet these demands. Three critical areas that need to be enhanced in order to deliver this increase in traffic are larger bandwidth, lower latency, and higher data rates.

One of the major limiting factors in wireless innovation is the availability in spectrum. To mitigate this, the unlicensed spectrum has been an area of interest to expand the availability of Long Term Enhancement (LTE). In this context, one of the major enhancements for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
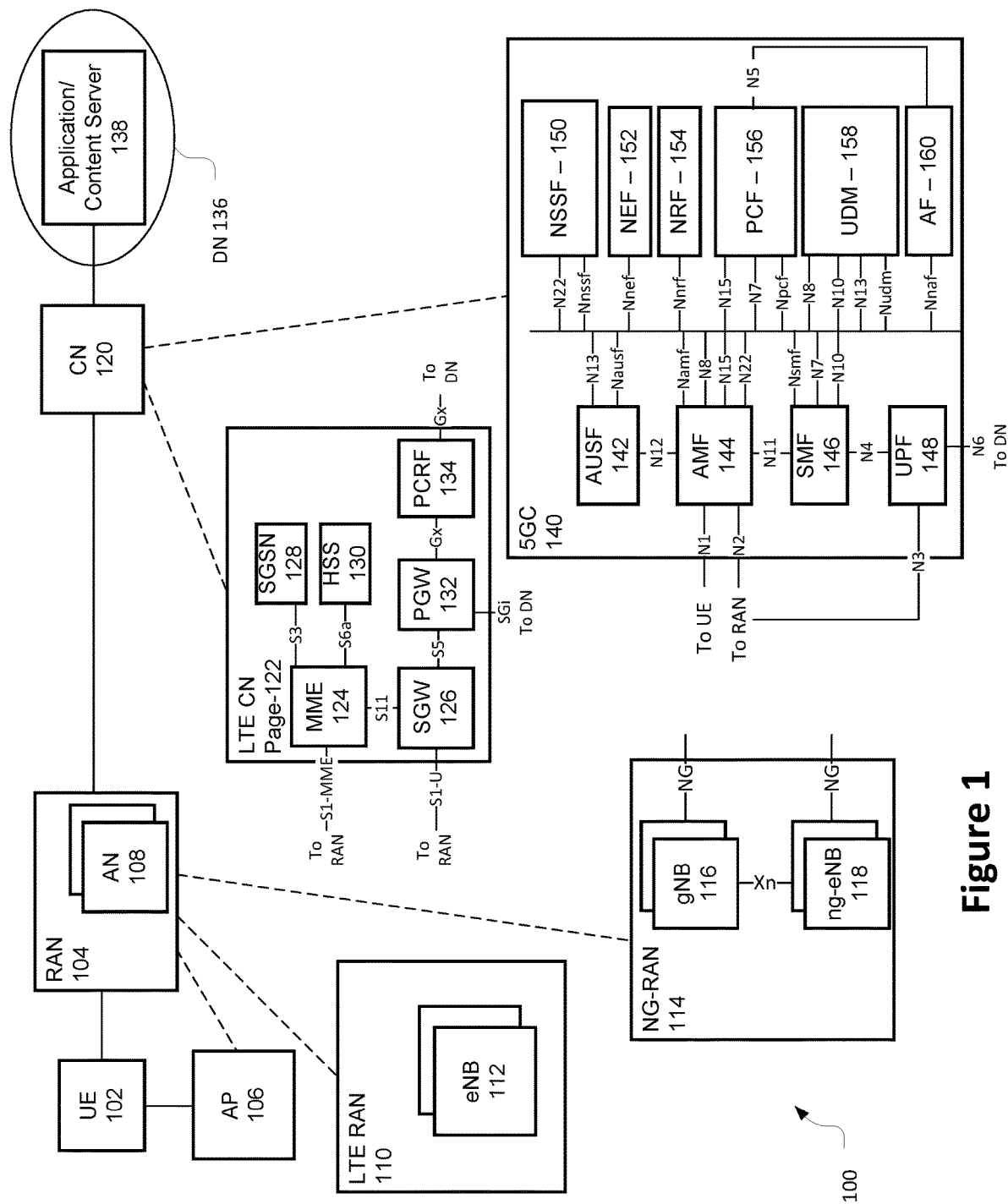
FIG. 1 schematically illustrates a wireless network in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein provide techniques for wireless communication on New Radio unlicensed (NR-U) spectrum. For example, embodiments include techniques for a new listen-before-talk type and associated measurement window. Additionally, embodiments include techniques for determination of a cyclic prefix (CP) extension for an uplink transmission, such as a configured grant transmission or a dynamically scheduled transmission. The techniques may be implemented in a user equipment (UE) and/or an access node (AN), such as UE 102 and/or AN 108 of FIG. 1, and/or UE 202 and/or AN 204 of FIG. 2, discussed further below.

Now that the main building blocks for the framework of New Radio (NR) have been established, a natural enhancement is to allow it to also operate on unlicensed spectrum. The work to introduce shared/unlicensed spectrum in 5G NR has already been kicked off, and a new work item (WI) on "NR-Based Access to Unlicensed Spectrum" was approved in TSG RAN Meeting #82. One objective of this new WI:

Physical layer aspects including [RAN1]:
  Frame structure including single and multiple DL to UL and UL to DL switching points within a shared COT with associated identified LBT requirements (TR 38.889 Section 7.2.1.3.1).
  UL data channel including extension of PUSCH to support PRB-based frequency block-interlaced transmission; support of multiple PUSCH(s) starting positions in one or multiple slot(s) depending on the LBT outcome with the understanding that the ending position is indicated by the UL grant; design not requiring the UE to change a granted TBS for a PUSCH transmission depending on the LBT outcome. The necessary PUSCH enhancements based on CP-OFDM. Applicability of sub-PRB frequency block-interlaced transmission for 60 kHz to be decided by RAN1.

Physical layer procedure(s) including [RAN1, RAN2]:
  For LBE, channel access mechanism in line with agreements from the NR-U study item (TR 38.889, Section 7.2.1.3.1). Specification work to be performed by RAN1.
  HARQ operation: NR HARQ feedback mechanisms are the baseline for NR-U operation with extensions in line with agreements during the study phase (NR-U TR section 7.2.1.3.3), including immediate transmission of HARQ A/N for the corresponding data in the same shared COT as well as transmission of HARQ A/N in a subsequent COT. Potentially support mechanisms to provide multiple and/or supplemental time and/or frequency domain transmission opportunities. (RAN1)

Scheduling multiple TTIs for PUSCH in-line with agreements from the study phase (TR 38.889, Section 7.2.1.3.3). (RAN1)

Configured Grant operation: NR Type-1 and Type-2 configured grant mechanisms are the baseline for NR-U operation with modifications in line with agreements during the study phase (NR-U TR section 7.2.1.3.4). (RAN1)

Data multiplexing aspects (for both UL and DL) considering LBT and channel access priorities. (RAN1/RAN2)

One of the challenges in this case is that this system must maintain fair coexistence with other incumbent technologies, and in order to do so depending on the particular band in which it might operate some restriction might be taken into account when designing this system. For instance, if operating in the 5 GHz band, a listen before talk (LBT) procedure needs to be performed to acquire the medium before a transmission can occur. In FBE operation, where the absence of any other technology sharing a channel can be guaranteed on a long-term basis (e.g. by level of regulation), a new type of 25 us CAT2 LBT can be performed. This new 25 us LBT type in which a single 9 us measurement window is performed is defined in this disclosure. In addition, for CWS adjustment in the configured grant case, there could be a mixture of TB based and CBG-based in a reference duration. Such mixture case is also addressed in this disclosure.

In a NR system operating on unlicensed spectrum, since a transmission is conditional to the success of the LBT procedure in FBE, reducing the complexity of such procedure is necessary.

In accordance with various embodiments herein, a mechanism in which one 9 microsecond slot is measured within a 25 microsecond interval is defined. One possible definition is to define a new channel access procedure, such as Type 2D, in 3GPP TS 37.213:

If a UE is indicated to perform Type 2D UL channel access procedures, the UE uses Type 2D UL channel access procedures for a UL transmission. The UE may transmit the transmission immediately after sensing the channel to be idle for at least a sensing interval $T_{short\_ul}=25$ us. $T_{short\_ul}$ consists of a duration $T_f=16$ us immediately followed by one slot sensing slot. The channel is considered to be idle for $T_{short\_ul}$ if the sensing slot of $T_{short\_ul}$ is sensed to be idle.

A similar definition could be made for the eNB/gNB. In this case the following definition is proposed:

An eNB/gNB may transmit a DL transmission immediately after sensing the channel to be idle for at least a sensing interval $T_{short\_dl}=25$ us.

$T_{short\_dl}$ consists of a duration $T_f=16$ us immediately followed by one sensing slot. The channel is considered to be idle for $T_{short\_dl}$ if the sensing slot sensed to be idle.

With this change, the channel access type & CP extension tables for DCI 0_0 and DCI format 1_0 should depend on the value of ChannelAccessMode-r16.

If (ChannelAccessMode-r16=dynamic), the table becomes

| Bit field mapped to index | Channel Access Type | CP extension |
|---|---|---|
| 0 | Type2C-ULChannelAccess defined in [subclause 4.2.1.2.3 in 37.213] | C2*symbol length - 16 us - TA |
| 1 | Type2A-ULChannelAccess defined in [subclause 4.2.1.2.1 in 37.213] | C3*symbol length - 25 us - TA |
| 2 | Type2A-ULChannelAccess defined in [subclause 4.2.1.2.1 in 37.213] | C1*symbol length - 25 us |
| 3 | Type 1-ULChannelAccess defined in [subclause 4.2.1.1 in 37.213] | 0 |

Since DCI 0_0 and 1_0 information is received after SIB1, which indicates whether the system is configured in FBE or LBE more, it may be possible to reduce the 2 bit mapping table to a single bit for the case when (ChannelAccessMode-r16=semistatic),

| Bit field mapped to index | Channel Access Type | CP extension |
|---|---|---|
| 0 | Type2D-ULChannelAccess | C3*symbol length - 25 us - TA |
| 1 | Type2D-ULChannelAccess | C1*symbol length - 25 us |

If 2 bits are needed for this for the case when (ChannelAccessMode-r16=semistatic), another embodiment is

| Bit field mapped to index | Channel Access Type | CP extension |
|---|---|---|
| 0 | Type2D-ULChannelAccess | C3*symbol length - 25 us - TA |
| 1 | Type2D-ULChannelAccess | C1*symbol length - 25 us |
| 2 | Type2D-ULChannelAccess | 0 |
| 3 | Type2C-ULChannelAccess defined in [subclause 4.2.1.2.3 in 37.213] | C2*symbol length - 16 us - TA |

Note that another embodiment is one in which the bit fields are changed. For example, the following table is a valid set.

| Bit field mapped to index | Channel Access Type | CP extension |
|---|---|---|
| 0 | Type2C-ULChannelAccess defined in [clause 4.2.1.2.3 in 37.213] | C2*symbol length - 16 us - TA |
| 1 | Type2D-ULChannelAccess defined in [clause 4.2.1.2.4 in 37.213] | C3*symbol length - 25 us - TA |
| 2 | Type2D-ULChannelAccess defined in [clause 4.2.1.2.4 in 37.213] | C1*symbol length - 25 us |
| 3 | Type2D-ULChannelAccess defined in [clause 4.2.1.4 in 37.213] | 0 |

If (ChannelAccessMode-r16=semistatic), another embodiment is

| Bit field mapped to index | Channel Access Type | CP extension |
|---|---|---|
| 0 | Type2D-ULChannelAccess | C3*symbol length - 25 us - TA |
| 1 | Type2D-ULChannelAccess | C1*symbol length - 25 us |
| 2 | Type2D-ULChannelAccess | 0 |
| 3 | Type2C-ULChannelAccess defined in [subclause 4.2.1.2.3 in 37.213] | 0 |

If (ChannelAccessMode-r16=semistatic), another embodiment is

| Bit field mapped to index | Channel Access Type | CP extension |
|---|---|---|
| 0 | Type2D-ULChannelAccess | C3*symbol length - 25 us - TA |
| 1 | Type2D-ULChannelAccess | C1*symbol length - 25 us |
| 2 | Type2C-ULChannelAccess defined in [subclause 4.2.1.2.3 in 37.213] | C2*symbol length - 16 us - TA |
| 3 | Type2C-ULChannelAccess defined in [subclause 4.2.1.2.3 in 37.213] | 0 |

Similarly, Table 7.3.1.1.2-35 in 38.212, which are the allowed entries for DCI 0_1, could be conditioned on whether (ChannelAccessMode-r16=dynamic) or (ChannelAccessMode-r16=semistatic). When ChannelAccessMode-r16=dynamic, the table becomes

| Entry index | Channel Access Type | CP extension | CAPC |
|---|---|---|---|
| 0 | Type2C-ULChannelAccess defined in [clause 4.2.1.2.3 in 37.213] | 0 | 1 |
| 1 | Type2C-ULChannelAccess defined in [clause 4.2.1.2.3 in 37.213] | 0 | 2 |
| 2 | Type2C-ULChannelAccess defined in [clause 4.2.1.2.3 in 37.213] | 0 | 3 |
| 3 | Type2C-ULChannelAccess defined in [clause 4.2.1.2.3 in 37.213] | 0 | 4 |
| 4 | Type2C-ULChannelAccess defined in [clause 4.2.1.2.3 in 37.213] | C2*symbol length - 16 us-TA | 1 |
| 5 | Type2C-ULChannelAccess defined in [clause 4.2.1.2.3 in 37.213] | C2*symbol length - 16 us-TA | 2 |
| 6 | Type2C-ULChannelAccess defined in [clause 4.2.1.2.3 in 37.213] | C2*symbol length - 16 us-TA | 3 |
| 7 | Type2C-ULChannelAccess defined in [clause 4.2.1.2.3 in 37.213] | C2*symbol length - 16 us-TA | 4 |
| 8 | Type2B-ULChannelAccess defined in [clause 4.2.1.2.3 in 37.213] | 0 | 1 |
| 9 | Type2B-ULChannelAccess defined in [clause 4.2.1.2.3 in 37.213] | 0 | 2 |
| 10 | Type2B-ULChannelAccess defined in [clause 4.2.1.2.3 in 37.213] | 0 | 3 |
| 11 | Type2B-ULChannelAccess defined in [clause 4.2.1.2.3 in 37.213] | 0 | 4 |
| 12 | Type2B-ULChannelAccess defined in [clause 4.2.1.2.3 in 37.213] | C2*symbol length - 16 us-TA | 1 |
| 13 | Type2B-ULChannelAccess defined in [clause 4.2.1.2.3 in 37.213] | C2*symbol length - 16 us-TA | 2 |
| 14 | Type2B-ULChannelAccess defined in [clause 4.2.1.2.3 in 37.213] | C2*symbol length - 16 us-TA | 3 |
| 15 | Type2B-ULChannelAccess defined in [clause 4.2.1.2.3 in 37.213] | C2*symbol length - 16 us-TA | 4 |
| 16 | Type2A-ULChannelAccess defined in [clause 4.2.1.2.1 in 37.213] | 0 | 1 |
| 17 | Type2A-ULChannelAccess defined in [clause 4.2.1.2.1 in 37.213] | 0 | 2 |
| 18 | Type2A-ULChannelAccess defined in [clause 4.2.1.2.1 in 37.213] | 0 | 3 |
| 19 | Type2A-ULChannelAccess defined in [clause 4.2.1.2.1 in 37.213] | 0 | 4 |
| 20 | Type2A-ULChannelAccess defined in [clause 4.2.1.2.1 in 37.213] | C1*symbol length - 25 us | 1 |
| 21 | Type2A-ULChannelAccess defined in [clause 4.2.1.2.1 in 37.213] | C1*symbol length - 25 us | 2 |
| 22 | Type2A-ULChannelAccess defined in [clause 4.2.1.2.1 in 37.213] | C1*symbol length - 25 us | 3 |
| 23 | Type2A-ULChannelAccess defined in [clause 4.2.1.2.1 in 37.213] | C1*symbol length - 25 us | 4 |
| 24 | Type2A-ULChannelAccess defined in [clause 4.2.1.2.1 in 37.213] | C3*symbol length - 25 us - TA | 1 |

| Entry index | Channel Access Type | CP extension | CAPC |
|---|---|---|---|
| 25 | Type2A-ULChannelAccess defined in [clause 4.2.1.2.1 in 37.213] | C3*symbol length - 25 us - TA | 2 |
| 26 | Type2A-ULChannelAccess defined in [clause 4.2.1.2.1 in 37.213] | C3*symbol length - 25 us - TA | 3 |
| 27 | Type2A-ULChannelAccess defined in [clause 4.2.1.2.1 in 37.213] | C3*symbol length - 25 us - TA | 4 |
| 28 | Type1-ULChannelAccess defined in [clause 4.2.1.1 in 37.213] | 0 | 1 |
| 29 | Type1-ULChannelAccess defined in [clause 4.2.1.1 in 37.213] | 0 | 2 |
| 30 | Type1-ULChannelAccess defined in [clause 4.2.1.1 in 37.213] | 0 | 3 |
| 31 | Type1-ULChannelAccess defined in [clause 4.2.1.1 in 37.213] | 0 | 4 |
| 32 | Type1-ULChannelAccess defined in [clause 4.2.1.1 in 37.213] | C1*symbol length - 25 us | 1 |
| 33 | Type1-ULChannelAccess defined in [clause 4.2.1.1 in 37.213] | C1*symbol length - 25 us | 2 |
| 34 | Type1-ULChannelAccess defined in [clause 4.2.1.1 in 37.213] | C1*symbol length - 25 us | 3 |
| 35 | Type1-ULChannelAccess defined in [clause 4.2.1.1 in 37.213] | C1*symbol length - 25 us | 4 |
| 36 | Type1-ULChannelAccess defined in [clause 4.2.1.1 in 37.213] | C2*symbol length - 16 us-TA | 1 |
| 37 | Type1-ULChannelAccess defined in [clause 4.2.1.1 in 37.213] | C2*symbol length - 16 us-TA | 2 |
| 38 | Type1-ULChannelAccess defined in [clause 4.2.1.1 in 37.213] | C2*symbol length - 16 us-TA | 3 |
| 39 | Type1-ULChannelAccess defined in [clause 4.2.1.1 in 37.213] | C2*symbol length - 16 us-TA | 4 |
| 40 | Type1-ULChannelAccess defined in [clause 4.2.1.1 in 37.213] | C3*symbol length - 25 us - TA | 1 |
| 41 | Type1-ULChannelAccess defined in [clause 4.2.1.1 in 37.213] | C3*symbol length - 25 us - TA | 2 |
| 42 | Type1-ULChannelAccess defined in [clause 4.2.1.1 in 37.213] | C3*symbol length - 25 us - TA | 3 |
| 43 | Type1-ULChannelAccess defined in [clause 4.2.1.1 in 37.213] | C3*symbol length - 25 us - TA | 4 |

When ChannelAccessMode-r16=semistatic, the table becomes

| Entry index | Channel Access Type | CP extension | CAPC |
|---|---|---|---|
| 0 | Type2C-ULChannelAccess defined in [clause 4.2.1.2.3 in 37.213] | 0 | 1 |
| 1 | Type2C-ULChannelAccess defined in [clause 4.2.1.2.3 in 37.213] | 0 | 2 |
| 2 | Type2C-ULChannelAccess defined in [clause 4.2.1.2.3 in 37.213] | 0 | 3 |
| 3 | Type2C-ULChannelAccess defined in [clause 4.2.1.2.3 in 37.213] | 0 | 4 |
| 4 | Type2C-ULChannelAccess defined in [clause 4.2.1.2.3 in 37.213] | C2*symbol length - 16 us-TA | 1 |
| 5 | Type2C-ULChannelAccess defined in [clause 4.2.1.2.3 in 37.213] | C2*symbol length - 16 us-TA | 2 |
| 6 | Type2C-ULChannelAccess defined in [clause 4.2.1.2.3 in 37.213] | C2*symbol length - 16 us-TA | 3 |
| 7 | Type2C-ULChannelAccess defined in [clause 4.2.1.2.3 in 37.213] | C2*symbol length - 16 us-TA | 4 |
| 8 | Type2D-ULChannelAccess defined in [clause 4.2.1.2.1 in 37.213] | 0 | 1 |
| 9 | Type2D-ULChannelAccess defined in [clause 4.2.1.2.1 in 37.213] | 0 | 2 |
| 10 | Type2D-ULChannelAccess defined in [clause 4.2.1.2.1 in 37.213] | 0 | 3 |
| 11 | Type2D-ULChannelAccess defined in [clause 4.2.1.2.1 in 37.213] | 0 | 4 |
| 12 | Type2D-ULChannelAccess defined in [clause 4.2.1.2.1 in 37.213] | C1*symbol length - 25 us | 1 |
| 13 | Type2D-ULChannelAccess defined in [clause 4.2.1.2.1 in 37.213] | C1*symbol length - 25 us | 2 |
| 14 | Type2D-ULChannelAccess defined in [clause 4.2.1.2.1 in 37.213] | C1*symbol length - 25 us | 3 |
| 15 | Type2D-ULChannelAccess defined in [clause 4.2.1.2.1 in 37.213] | C1*symbol length - 25 us | 4 |

-continued

| Entry index | Channel Access Type | CP extension | CAPC |
|---|---|---|---|
| 16 | Type2D-ULChannelAccess defined in [clause 4.2.1.2.1 in 37.213] | C3*symbol length - 25 us - TA | 1 |
| 17 | Type2D-ULChannelAccess defined in [clause 4.2.1.2.1 in 37.213] | C3*symbol length - 25 us - TA | 2 |
| 18 | Type2D-ULChannelAccess defined in [clause 4.2.1.2.1 in 37.213] | C3*symbol length - 25 us - TA | 3 |
| 19 | Type2D-ULChannelAccess defined in [clause 4.2.1.2.1 in 37.213] | C3*symbol length - 25 us - TA | 4 |

An alternate embodiment is where the two tables are combined. For example, for DCI 0_1, we could have

TABLE 7

3.1.1.2-35: Allowed entries for DCI format 01, configured by high layer parameter ULDCI-trigerred-UL-ChannelAccess-CPext-CAPC-List-r16

| Entry index | Channel Access Type | CP extension | CAPC |
|---|---|---|---|
| 0 | Type2C-ULChannelAccess defined in [clause 4.2.1.2.3 in 37.213] | 0 | 1 |
| 1 | Type2C-ULChannelAccess defined in [clause 4.2.1.2.3 in 37.213] | 0 | 2 |
| 2 | Type2C-ULChannelAccess defined in [clause 4.2.1.2.3 in 37.213] | 0 | 3 |
| 3 | Type2C-ULChannelAccess defined in [clause 4.2.1.2.3 in 37.213] | 0 | 4 |
| 4 | Type2C-ULChannelAccess defined in [clause 4.2.1.2.3 in 37.213] | C2*symbol length - 16 us - TA | 1 |
| 5 | Type2C-ULChannelAccess defined in [clause 4.2.1.2.3 in 37.213] | C2*symbol length - 16 us - TA | 2 |
| 6 | Type2C-ULChannelAccess defined in [clause 4.2.1.2.3 in 37.213] | C2*symbol length - 16 us - TA | 3 |
| 7 | Type2C-ULChannelAccess defined in [clause 4.2.1.2.3 in 37.213] | C2*symbol length - 16 us - TA | 4 |
| 8 | Type2B-ULChannelAccess defined in [clause 4.2.1.2.3 in 37.213] | 0 | 1 |
| 9 | Type2B-ULChannelAccess defined in [clause 4.2.1.2.3 in 37.213] | 0 | 2 |
| 10 | Type2B-ULChannelAccess defined in [clause 4.2.1.2.3 in 37.213] | 0 | 3 |
| 11 | Type2B-ULChannelAccess defined in [clause 4.2.1.2.3 in 37.213] | 0 | 4 |
| 12 | Type2B-ULChannelAccess defined in [clause 4.2.1.2.3 in 37.213] | C2*symbol length - 16 us - TA | 1 |
| 13 | Type2B-ULChannelAccess defined in [clause 4.2.1.2.3 in 37.213] | C2*symbol length - 16 us - TA | 2 |
| 14 | Type2B-ULChannelAccess defined in [clause 4.2.1.2.3 in 37.213] | C2*symbol length - 16 us - TA | 3 |
| 15 | Type2B-ULChannelAccess defined in [clause 4.2.1.2.3 in 37.213] | C2*symbol length - 16 us - TA | 4 |
| 16 | Type2A-ULChannelAccess defined in [clause 4.2.1.2.1 in 37.213] | 0 | 1 |
| 17 | Type2A-ULChannelAccess defined in [clause 4.2.1.2.1 in 37.213] | 0 | 2 |
| 18 | Type2A-ULChannelAccess defined in [clause 4.2.1.2.1 in 37.213] | 0 | 3 |
| 19 | Type2A-ULChannelAccess defined in [clause 4.2.1.2.1 in 37.213] | 0 | 4 |
| 20 | Type2A-ULChannelAccess defined in [clause 4.2.1.2.1 in 37.213] | C1*symbol length - 25 us | 1 |
| 21 | Type2A-ULChannelAccess defined in [clause 4.2.1.2.1 in 37.213] | C1*symbol length - 25 us | 2 |
| 22 | Type2A-ULChannelAccess defined in [clause 4.2.1.2.1 in 37.213] | C1*symbol length - 25 us | 3 |
| 23 | Type2A-ULChannelAccess defined in [clause 4.2.1.2.1 in 37.213] | C1*symbol length - 25 us | 4 |
| 24 | Type2A-ULChannelAccess defined in [clause 4.2.1.2.1 in 37.213] | C3*symbol length - 25 us - TA | 1 |
| 25 | Type2A-ULChannelAccess defined in [clause 4.2.1.2.1 in 37.213] | C3*symbol length - 25 us - TA | 2 |
| 26 | Type2A-ULChannelAccess defined in [clause 4.2.1.2.1 in 37.213] | C3*symbol length - 25 us - TA | 3 |

TABLE 7-continued 3.1.1.2-35: Allowed entries for DCI format 01, configured by high layer parameter ULDCI-trigerred-UL-ChannelAccess-CPext-CAPC-List-r16

| Entry index | Channel Access Type | CP extension | CAPC |
|---|---|---|---|
| 27 | Type2A-ULChannelAccess defined in [clause 4.2.1.2.1 in 37.213] | C3*symbol length - 25 us - TA | 4 |
| 28 | Type1-ULChannelAccess defined in [clause 4.2.1.1 in 37.213] | 0 | 1 |
| 29 | Type1-ULChannelAccess defined in [clause 4.2.1.1 in 37.213] | 0 | 2 |
| 30 | Type1-ULChannelAccess defined in [clause 4.2.1.1 in 37.213] | 0 | 3 |
| 31 | Type1-ULChannelAccess defined in [clause 4.2.1.1 in 37.213] | 0 | 4 |
| 32 | Type1-ULChannelAccess defined in [clause 4.2.1.1 in 37.213] | C1*symbol length - 25 us | 1 |
| 33 | Type1-ULChannelAccess defined in [clause 4.2.1.1 in 37.213] | C1*symbol length - 25 us | 2 |
| 34 | Type1-ULChannelAccess defined in [clause 4.2.1.1 in 37.213] | C1*symbol length - 25 us | 3 |
| 35 | Type1-ULChannelAccess defined in [clause 4.2.1.1 in 37.213] | C1*symbol length - 25 us | 4 |
| 36 | Type1-ULChannelAccess defined in [clause 4.2.1.1 in 37.213] | C2*symbol length - 16 us - TA | 1 |
| 37 | Type1-ULChannelAccess defined in [clause 4.2.1.1 in 37.213] | C2*symbol length - 16 us - TA | 2 |
| 38 | Type1-ULChannelAccess defined in [clause 4.2.1.1 in 37.213] | C2*symbol length - 16 us - TA | 3 |
| 39 | Type1-ULChannelAccess defined in [clause 4.2.1.1 in 37.213] | C2*symbol length - 16 us - TA | 4 |
| 40 | Type1-ULChannelAccess defined in [clause 4.2.1.1 in 37.213] | C3*symbol length - 25 us - TA | 1 |
| 41 | Type1-ULChannelAccess defined in [clause 4.2.1.1 in 37.213] | C3*symbol length - 25 us - TA | 2 |
| 42 | Type1-ULChannelAccess defined in [clause 4.2.1.1 in 37.213] | C3*symbol length - 25 us - TA | 3 |
| 43 | Type1-ULChannelAccess defined in [clause 4.2.1.1 in 37.213] | C3*symbol length - 25 us - TA | 4 |
| 44 | Type2D-ULChannelAccess defined in [clause 4.2.1.2.4 in 37.213] | 0 | 1 |
| 45 | Type2D-ULChannelAccess defined in [clause 4.2.1.2.4 in 37.213] | 0 | 2 |
| 46 | Type2D-ULChannelAccess defined in [clause 4.2.1.2.4 in 37.213] | 0 | 3 |
| 47 | Type2D-ULChannelAccess defined in [clause 4.2.1.2.4 in 37.213] | 0 | 4 |
| 48 | Type2D-ULChannelAccess defined in [clause 4.2.1.2.4 in 37.213] | C1*symbol length - 25 us | 1 |
| 49 | Type2D-ULChannelAccess defined in [clause 4.2.1.2.4 in 37.213] | C1*symbol length - 25 us | 2 |
| 50 | Type2D-ULChannelAccess defined in [clause 4.2.1.2.4 in 37.213] | C1*symbol length - 25 us | 3 |
| 51 | Type2D-ULChannelAccess defined in [clause 4.2.1.2.4 in 37.213] | C1*symbol length - 25 us | 4 |
| 52 | Type2D-ULChannelAccess defined in [clause 4.2.1.2.4 in 37.213] | C3*symbol length - 25 us - TA | 1 |
| 53 | Type2D-ULChannelAccess defined in [clause 4.2.1.2.4 in 37.213] | C3*symbol length - 25 us - TA | 2 |
| 54 | Type2D-ULChannelAccess defined in [clause 4.2.1.2.4 in 37.213] | C3*symbol length - 25 us - TA | 3 |
| 55 | Type2D-ULChannelAccess defined in [clause 4.2.1.2.4 in 37.213] | C3*symbol length - 25 us - TA | 4 |

For DCI 1_1, a new table (see Table 7.3.1.2.2-6 in 38.212) could be needed as well. If (ChannelAccessMode-r16=dynamic), the table becomes

| Entry index | Channel Access Type | CP extension |
|---|---|---|
| 0 | Type2C-ULChannelAccess defined in [clause 4.2.1.2.3 in 37.213] | 0 |
| 1 | Type2C-ULChannelAccess defined in [clause 4.2.1.2.3 in 37.213] | C2*symbol length - 16 us - TA |
| 2 | Type2B-ULChannelAccess defined in [clause 4.2.1.2.3 in 37.213] | 0 |
| 3 | Type2B-ULChannelAccess defined in [clause 4.2.1.2.3 in 37.213] | C2*symbol length - 16 us - TA |

-continued

| Entry index | Channel Access Type | CP extension |
|---|---|---|
| 4 | Type2A-ULChannelAccess defined in [clause 4.2.1.2.1 in 37.213] | 0 |
| 5 | Type2A-ULChannelAccess defined in [clause 4.2.1.2.1 in 37.213] | C1*symbol length - 25 us |
| 6 | Type2A-ULChannelAccess defined in [clause 4.2.1.2.1 in 37.213] | C3*symbol length - 25 us - TA |
| 7 | Type1-ULChannelAccess defined in [clause 4.2.1.1 in 37.213] | 0 |
| 8 | Type1-ULChannelAccess defined in [clause 4.2.1.1 in 37.213] | C1*symbol length - 25 us |
| 9 | Type1-ULChannelAccess defined in [clause 4.2.1.1 in 37.213] | C2*symbol length - 16 us - TA |
| 10 | Type1-ULChannelAccess defined in [clause 4.2.1.1 in 37.213] | C3*symbol length - 25 us - TA |

For DCI 1_1, if (ChannelAccessMode-r16=semistatic), the following table is proposed

| Entry index | Channel Access Type | CP extension |
|---|---|---|
| 0 | Type2C-ULChannelAccess defined in [clause 4.2.1.2.3 in 37.213] | 0 |
| 1 | Type2C-ULChannelAccess defined in [clause 4.2.1.2.3 in 37.213] | C2*symbol length - 16 us - TA |

-continued

| Entry index | Channel Access Type | CP extension |
|---|---|---|
| 2 | Type2D-ULChannelAccess | 0 |
| 3 | Type2D-ULChannelAccess | C1*symbol length - 25 us |
| 4 | Type2D-ULChannelAccess | C3*symbol length - 25 us - TA |

An alternate solution is to combine the tables as shown below

Allowed entries for DCI format 1_1, configured by high layer parameter DLDCI-trigerred-UL-ChannelAccess-CPext-CAPC-List-r16

| Entry index | Channel Access Type | CP extension |
|---|---|---|
| 0 | Type2C-ULChannelAccess defined in [clause 4.2.1.2.3 in 37.213] | 0 |
| 1 | Type2C-ULChannelAccess defined in [clause 4.2.1.2.3 in 37.213] | C2*symbol length - 16 us - TA |
| 2 | Type2B-ULChannelAccess defined in [clause 4.2.1.2.3 in 37.213] | 0 |
| 3 | Type2B-ULChannelAccess defined in [clause 4.2.1.2.3 in 37.213] | C2*symbol length - 16 us - TA |
| 4 | Type2A-ULChannelAccess defined in [clause 4.2.1.2.1 in 37.213] | 0 |
| 5 | Type2A-ULChannelAccess defined in [clause 4.2.1.2.1 in 37.213] | C1*symbol length - 25 us |
| 6 | Type2A-ULChannelAccess defined in [clause 4.2.1.2.1 in 37.213] | C3*symbol length - 25 us - TA |
| 7 | Type1-ULChannelAccess defined in [clause 4.2.1.1 in 37.213] | 0 |
| 8 | Type1-ULChannelAccess defined in [clause 4.2.1.1 in 37.213] | C1*symbol length - 25 us |
| 9 | Type1-ULChannelAccess defined in [clause 4.2.1.1 in 37.213] | C2*symbol length - 16 us - TA |
| 10 | Type1-ULChannelAccess defined in [clause 4.2.1.1 in 37.213] | C3*symbol length - 25 us - TA |
| 11 | Type2D-ULChannelAccess defined in [clause 4.2.1.2.4 in 37.213] | 0 |
| 12 | Type2D-ULChannelAccess defined in [clause 4.2.1.2.4 in 37.213] | C1*symbol length - 25 us |
| 13 | Type2D-ULChannelAccess defined in [clause 4.2.1.2.4 in 37.213] | C3*symbol length - 25 us - TA |

It was agreed that for the CP extension prior to at least a dynamically scheduled PUSCH transmission, the CP extension is located in the symbol(s) immediately preceding the PUSCH allocation indicated by SLIV. The supported durations for CP extension at the UE are:

0 (e.g. no CP extension)
C1*symbol length—25 us
C2*symbol length—16 us—TA
C3*symbol length—25 us—TA
C1=1 for 15 and 30 kHz SCS, C1=2 for 60 kHz SCS The variables C2 and C3 can be configured by RRC. The minimum and maximum values of C2 and C3 depend on both TA and subcarrier spacing values.

If TA is small, C2 could be equal to 1 for 60 kHz SCS. In addition, for large TA values (e.g. 2.003125 ms=3846*16*64*Tc, where Tc=1/(480e3*4096)), C2 max values can be as large as 29/29/29 for 15/30/60 kHz SCS. Similarly, C3 max values can be as large as 29/29/30 for 15/30/60 kHz SCS. In summary, in one embodiment, the supported range for C2 is 1, 2, . . . , 29 for 15, 30 kHz, and 60 kHz SCS In one embodiment, the supported range for C3 is 1, 2, . . . , 29 for 15 and 30 kHz SCS, and
2, 3, . . . , 30 for 60 kHz SCS.

In addition, the equation needs to consider both long and normal CP duration. Every 7/14/28 symbols, a long CP extension is applied for 15/30/60 kHz SCS. Taking this into account, one embodiment is shown in Table 5.3.1-X below. Table 5.3.1-X may replace Table 5.3.1-1 in 3GPP TS 38.211, Section 5.3.1.

2) At least a TB (out of N) falling in the reference burst is found to be ACK.

In the case of CBG based transmissions, the feedback is provided per TB in the configured grant case (CG-DFI in DCI 0_1). This means that feedback information at the CBG granularity is not available. In this case, even if 10% of the CBG related HARQ feedbacks were Acked, this information is not available. The only recourse to resetting the CWS is to have an Ack in the TB. To get around this, one embodiment is to allow for CBGTI to be included in the case of CG-DFI in DCI 0_1. Another embodiment is to disallow CBG transmissions in configured grant case.

In the non configured grant case, if M and N are comparable in value, the current rules may be appropriate. If M is much greater than N or M is much less than N, further optimizations may be required. A couple of solutions are possible here:

In one embodiment, the denominator in case 1) becomes N+MX, where X is the average number of CBG in a TB. In another embodiment, the denominator in case 1) becomes M+N. In another embodiment, for TB metric, which is case 2), we look for an Ack out of M+N TBs. If CBGTI data is available, the conversion to TB metric would be by "AND"ing the values of the CBGTI (a CBGTI set to 0 is assumed to be an Ack) so that a TB Ack is represented as "0" or by looking at the NDI (New Data Indicator) field and checking that it's toggled.

For the configured grant design, it was agreed that a UE applies a starting time offset at the beginning of a transmission burst with CG resources and applies a CP extension

TABLE 5.3.1-X

The cyclic extension $T_{ext}$

| Index | $\mu = 0$ | $\mu = 1$ | $\mu = 2$ |
|---|---|---|---|
| 0 | — | — | — |
| 1 | $T_{symb,l}^{\mu} - 25 \cdot 10^{-6}$ | $T_{symb,l}^{\mu} - 25 \cdot 10^{-6}$ | $\sum_{k=1}^{2} T_{symb,mod(l-k,7\cdot 2^{\mu})}^{\mu} - 25 \cdot 10^{-6}$ |
| 2 | $\sum_{k=1}^{C_2} T_{symb,mod(l-k,7\cdot 2^{\mu})}^{\mu} - 16 \cdot 10^{-6} - T_{TA}$ | $\sum_{k=1}^{C_2} T_{symb,mod(l-k,7\cdot 2^{\mu})}^{\mu} - 16 \cdot 10^{-6} - T_{TA}$ | $\sum_{k=1}^{C_2} T_{symb,mod(l-k,7\cdot 2^{\mu})}^{\mu} - 16 \cdot 10^{-6} - T_{TA}$ |
| 3 | $\sum_{k=1}^{C_3} T_{symb,mod(l-k,7\cdot 2^{\mu})}^{\mu} - 25 \cdot 10^{-6} - T_{TA}$ | $\sum_{k=1}^{C_3} T_{symb,mod(l-k,7\cdot 2^{\mu})}^{\mu} - 25 \cdot 10^{-6} - T_{TA}$ | $\sum_{k=1}^{C_3} T_{symb,mod(l-k,7\cdot 2^{\mu})}^{\mu} - 25 \cdot 10^{-6} - T_{TA}$ |

For contention-based random access or in absence of higher-layer configuration, a UE is unaware of the exact CP extension $T'_{ext}$ to apply, which is calculated as in previous embodiments, given that it does not have any information from the network related to the value of C2 or C3 to use. In one embodiment, a UE uses the largest integer value of $C_i$, where $i \in \{2,3\}$, that fulfils the following equation: $0 \leq T'_{ext} < T_{symb,0}^{\mu}$. In another embodiment, a UE uses the smallest integer value of $C_i$, where $i \in \{2,3\}$, that fulfils the following equation: $0 \leq T'_{ext} < T_{symb,0}^{\mu}$. In one embodiment, a UE uses the largest integer value of $C_i$, where $i \in \{2,3\}$, that fulfils the following equation: $0 \leq T'_{ext} < T_{symb, (l-Ci) mod 7\cdot 2^{\mu}}^{\mu}$ or in alternative $T'_{ext} < T_{symb, (l-Ci) mod 7\cdot 2^{\mu}}^{\mu}$.

If a UE is scheduled N PDSCHs with CBG and M PDSCHs with TB based transmissions in the reference duration, it has been agreed that the UE will reset the CWS if at least one of the following is met:

1) 10% of the HARQ feedbacks (out of M) related to CBGs falling in the reference burst are ACKed;

starting from the first symbol that is located right before the configured resources. Given that a symbol length may vary depending on the SCS and whether the symbol may be the first or not within a slot, then in one embodiment the CP extension may be evaluated according to the following equation:

$$T_{ext} = \sum_{k=1}^{N} T_{symb,(l-k) \, mod \, 7\cdot 2^{\mu}}^{\mu} - T_{offset}$$

where N=1/2/4 for µ=0/1/2 respectively, while $T_{offset}$ may assume as an example the following set of values:

{16, 25, 34, 43, 52, 61, 70}

$$\circ \left\{ 16, 25, 34, 43, 52, 61, \sum_{k=1}^{N} T_{symb,(l-k) \bmod 7 \cdot 2^{\mu}}^{\mu} \right\}$$

{16, 25, 34, 43, 52, 61, OS1 @ 15 KHz}

Systems and Implementations

Figure 2:
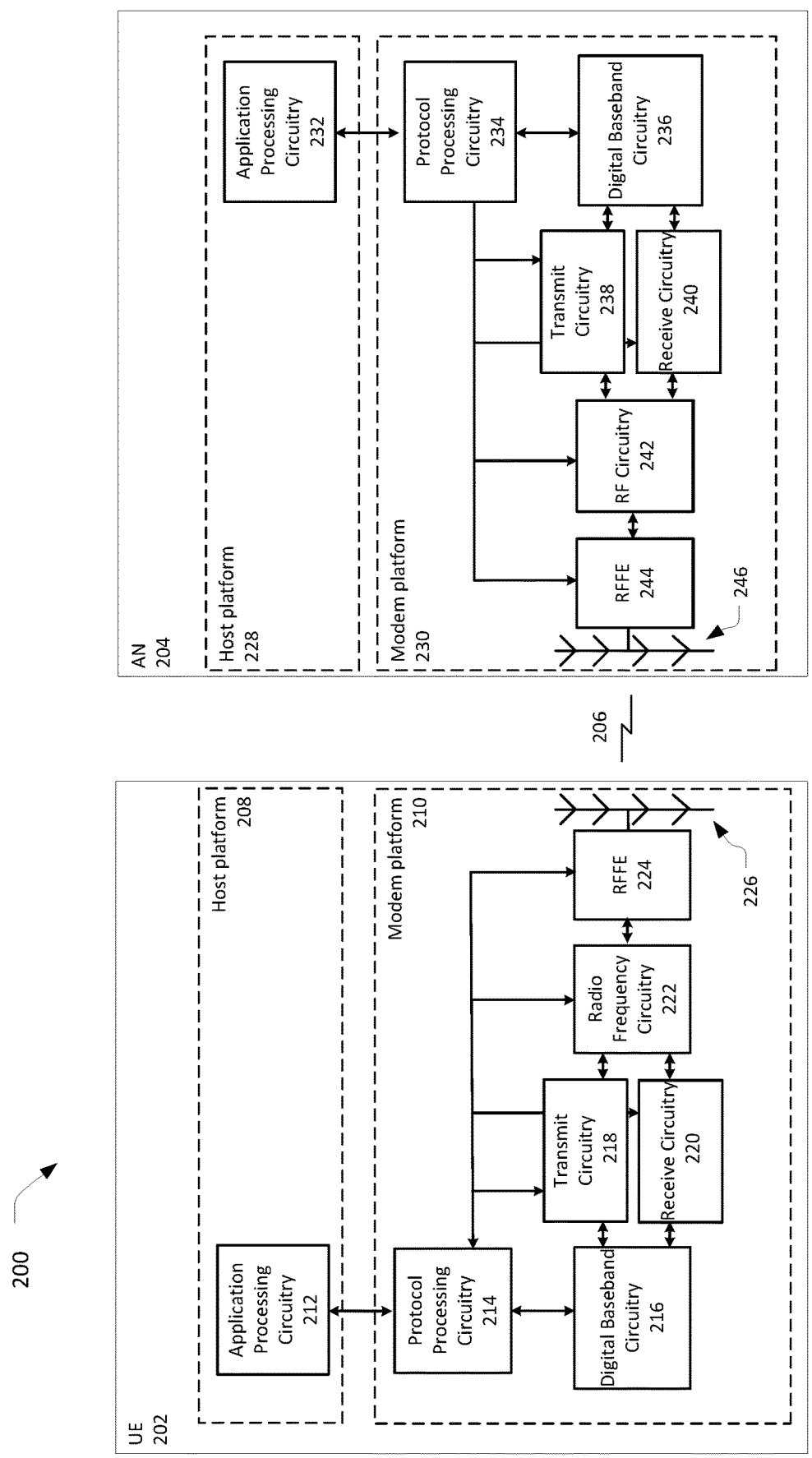
FIG. 2 schematically illustrates components of a wireless network in accordance with various embodiments.
Figure 3:
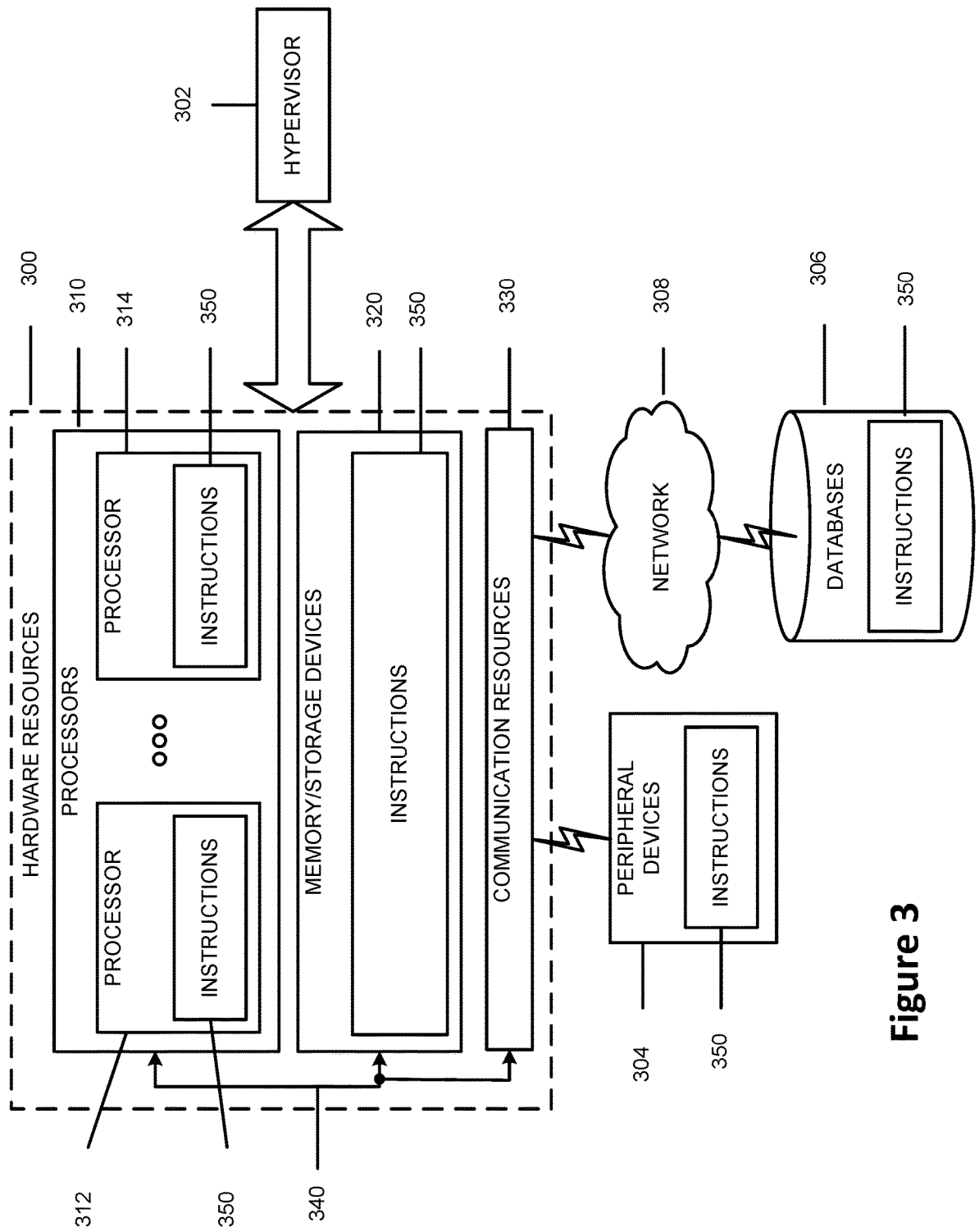
FIG. 3 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 1-3 illustrate various systems, devices, and components that may implement aspects of disclosed embodiments.

FIG. 1 illustrates a network 100 in accordance with various embodiments. The network 100 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 100 may include a UE 102, which may include any mobile or non-mobile computing device designed to communicate with a RAN 104 via an over-the-air connection. The UE 102 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 100 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 102 may additionally communicate with an AP 106 via an over-the-air connection. The AP 106 may manage a WLAN connection, which may serve to offload some/all network traffic from the RAN 104. The connection between the UE 102 and the AP 106 may be consistent with any IEEE 802.11 protocol, wherein the AP 106 could be a wireless fidelity (Wi-Fi®) router. In some embodiments, the UE 102, RAN 104, and AP 106 may utilize cellular-WLAN aggregation (for example, LWA/LWIP). Cellular-WLAN aggregation may involve the UE 102 being configured by the RAN 104 to utilize both cellular radio resources and WLAN resources.

The RAN 104 may include one or more access nodes, for example, AN 108. AN 108 may terminate air-interface protocols for the UE 102 by providing access stratum protocols including RRC, PDCP, RLC, MAC, and L1 protocols. In this manner, the AN 108 may enable data/voice connectivity between CN 120 and the UE 102. In some embodiments, the AN 108 may be implemented in a discrete device or as one or more software entities running on server computers as part of, for example, a virtual network, which may be referred to as a CRAN or virtual baseband unit pool. The AN 108 be referred to as a BS, gNB, RAN node, eNB, ng-eNB, NodeB, RSU, TRxP, TRP, etc. The AN 108 may be a macrocell base station or a low power base station for providing femtocells, picocells or other like cells having smaller coverage areas, smaller user capacity, or higher bandwidth compared to macrocells.

In embodiments in which the RAN 104 includes a plurality of ANs, they may be coupled with one another via an X2 interface (if the RAN 104 is an LTE RAN) or an Xn interface (if the RAN 104 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 104 may each manage one or more cells, cell groups, component carriers, etc. to provide the UE 102 with an air interface for network access. The UE 102 may be simultaneously connected with a plurality of cells provided by the same or different ANs of the RAN 104. For example, the UE 102 and RAN 104 may use carrier aggregation to allow the UE 102 to connect with a plurality of component carriers, each corresponding to a Pcell or Scell. In dual connectivity scenarios, a first AN may be a master node that provides an MCG and a second AN may be secondary node that provides an SCG. The first/second ANs may be any combination of eNB, gNB, ng-eNB, etc.

The RAN 104 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 102 or AN 108 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 104 may be an LTE RAN 110 with eNBs, for example, eNB 112. The LTE RAN 110 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 104 may be an NG-RAN 114 with gNBs, for example, gNB 116, or ng-eNBs, for example, ng-eNB 118. The gNB 116 may connect with 5G-enabled UEs using a 5G NR interface. The gNB 116 may connect with a 5G core through an NG interface, which may include an N2 interface or an N3 interface. The ng-eNB 118 may also connect with the 5G core through an NG interface, but may connect with a UE via an LTE air interface. The gNB 116 and the ng-eNB 118 may connect with each other over an Xn interface.

In some embodiments, the NG interface may be split into two parts, an NG user plane (NG-U) interface, which carries traffic data between the nodes of the NG-RAN 114 and a UPF 148 (e.g., N3 interface), and an NG control plane (NG-C) interface, which is a signaling interface between the nodes of the NG-RAN 114 and an AMF 144 (e.g., N2 interface).

The NG-RAN 114 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 102 can be configured with multiple BWPs where each BWP configuration has a different SCS. When a BWP change is indicated to the UE 102, the SCS of the transmission is changed as well. Another use case example of BWP is related to power saving. In particular, multiple BWPs can be configured for the UE 102 with different amount of frequency resources (for example, PRBs) to support data transmission under different traffic loading scenarios. A BWP containing a smaller number of PRBs can be used for data transmission with small traffic load while allowing power saving at the UE 102 and in some cases at the gNB 116. A BWP containing a larger number of PRBs can be used for scenarios with higher traffic load.

The RAN 104 is communicatively coupled to CN 120 that includes network elements to provide various functions to support data and telecommunications services to customers/subscribers (for example, users of UE 102). The components of the CN 120 may be implemented in one physical node or separate physical nodes. In some embodiments, NFV may be utilized to virtualize any or all of the functions provided by the network elements of the CN 120 onto physical compute/storage resources in servers, switches, etc. A logical instantiation of the CN 120 may be referred to as a network slice, and a logical instantiation of a portion of the CN 120 may be referred to as a network sub-slice.

In some embodiments, the CN 120 may be an LTE CN 122, which may also be referred to as an EPC. The LTE CN 122 may include MME 124, SGW 126, SGSN 128, HSS 130, PGW 132, and PCRF 134 coupled with one another over interfaces (or "reference points") as shown. Functions of the elements of the LTE CN 122 may be briefly introduced as follows.

The MME 124 may implement mobility management functions to track a current location of the UE 102 to facilitate paging, bearer activation/deactivation, handovers, gateway selection, authentication, etc.

The SGW 126 may terminate an S1 interface toward the RAN and route data packets between the RAN and the LTE CN 122. The SGW 126 may be a local mobility anchor point for inter-RAN node handovers and also may provide an anchor for inter-3GPP mobility. Other responsibilities may include lawful intercept, charging, and some policy enforcement.

The SGSN 128 may track a location of the UE 102 and perform security functions and access control. In addition, the SGSN 128 may perform inter-EPC node signaling for mobility between different RAT networks; PDN and S-GW selection as specified by MME 124; MME selection for handovers; etc. The S3 reference point between the MME 124 and the SGSN 128 may enable user and bearer information exchange for inter-3GPP access network mobility in idle/active states.

The HSS 130 may include a database for network users, including subscription-related information to support the network entities' handling of communication sessions. The HSS 130 can provide support for routing/roaming, authentication, authorization, naming/addressing resolution, location dependencies, etc. An S6a reference point between the HSS 130 and the MME 124 may enable transfer of subscription and authentication data for authenticating/authorizing user access to the LTE CN 120.

The PGW 132 may terminate an SGi interface toward a data network (DN) 136 that may include an application/content server 138. The PGW 132 may route data packets between the LTE CN 122 and the data network 136. The PGW 132 may be coupled with the SGW 126 by an S5 reference point to facilitate user plane tunneling and tunnel management. The PGW 132 may further include a node for policy enforcement and charging data collection (for example, PCEF). Additionally, the SGi reference point between the PGW 132 and the data network 136 may be an operator external public, a private PDN, or an intra-operator packet data network, for example, for provision of IMS services. The PGW 132 may be coupled with a PCRF 134 via a Gx reference point.

The PCRF 134 is the policy and charging control element of the LTE CN 122. The PCRF 134 may be communicatively coupled to the app/content server 138 to determine appropriate QoS and charging parameters for service flows. The PCRF 132 may provision associated rules into a PCEF (via Gx reference point) with appropriate TFT and QCI.

In some embodiments, the CN 120 may be a 5GC 140. The 5GC 140 may include an AUSF 142, AMF 144, SMF 146, UPF 148, NSSF 150, NEF 152, NRF 154, PCF 156, UDM 158, and AF 160 coupled with one another over interfaces (or "reference points") as shown. Functions of the elements of the 5GC 140 may be briefly introduced as follows.

The AUSF 142 may store data for authentication of UE 102 and handle authentication-related functionality. The AUSF 142 may facilitate a common authentication framework for various access types. In addition to communicating with other elements of the 5GC 140 over reference points as shown, the AUSF 142 may exhibit an Nausf service-based interface.

The AMF 144 may allow other functions of the 5GC 140 to communicate with the UE 102 and the RAN 104 and to subscribe to notifications about mobility events with respect to the UE 102. The AMF 144 may be responsible for registration management (for example, for registering UE 102), connection management, reachability management, mobility management, lawful interception of AMF-related events, and access authentication and authorization. The AMF 144 may provide transport for SM messages between the UE 102 and the SMF 146, and act as a transparent proxy for routing SM messages. AMF 144 may also provide transport for SMS messages between UE 102 and an SMSF. AMF 144 may interact with the AUSF 142 and the UE 102 to perform various security anchor and context management functions. Furthermore, AMF 144 may be a termination point of a RAN CP interface, which may include or be an N2 reference point between the RAN 104 and the AMF 144; and the AMF 144 may be a termination point of NAS (N1) signaling, and perform NAS ciphering and integrity protection. AMF 144 may also support NAS signaling with the UE 102 over an N3 IWF interface.

The SMF 146 may be responsible for SM (for example, session establishment, tunnel management between UPF 148 and AN 108); UE IP address allocation and management (including optional authorization); selection and control of UP function; configuring traffic steering at UPF 148 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 144 over N2 to AN 108; and determining SSC mode of a session. SM may refer to management of a PDU session, and a PDU session or "session" may refer to a PDU connectivity service that provides or enables the exchange of PDUs between the UE 102 and the data network 136.

The UPF 148 may act as an anchor point for intra-RAT and inter-RAT mobility, an external PDU session point of interconnect to data network 136, and a branching point to support multi-homed PDU session. The UPF 148 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 148 may include an uplink classifier to support routing traffic flows to a data network.

The NSSF 150 may select a set of network slice instances serving the UE 102. The NSSF 150 may also determine allowed NSSAI and the mapping to the subscribed S-NSSAIs, if needed. The NSSF 150 may also determine the AMF set to be used to serve the UE 102, or a list of candidate AMFs based on a suitable configuration and possibly by querying the NRF 154. The selection of a set of network slice instances for the UE 102 may be triggered by the AMF 144 with which the UE 102 is registered by interacting with the NSSF 150, which may lead to a change of AMF. The NSSF 150 may interact with the AMF 144 via an N22 reference point; and may communicate with another NSSF in a visited network via an N31 reference point (not shown). Additionally, the NSSF 150 may exhibit an Nnssf service-based interface.

The NEF 152 may securely expose services and capabilities provided by 3GPP network functions for third party, internal exposure/re-exposure, AFs (e.g., AF 160), edge computing or fog computing systems, etc. In such embodiments, the NEF 152 may authenticate, authorize, or throttle the AFs. NEF 152 may also translate information exchanged with the AF 160 and information exchanged with internal network functions. For example, the NEF 152 may translate between an AF-Service-Identifier and an internal 5GC information. NEF 152 may also receive information from other NFs based on exposed capabilities of other NFs. This information may be stored at the NEF 152 as structured data, or at a data storage NF using standardized interfaces. The stored information can then be re-exposed by the NEF 152 to other NFs and AFs, or used for other purposes such as analytics. Additionally, the NEF 152 may exhibit an Nnef service-based interface.

The NRF 154 may support service discovery functions, receive NF discovery requests from NF instances, and provide the information of the discovered NF instances to the NF instances. NRF 154 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 154 may exhibit the Nnrf service-based interface.

The PCF 156 may provide policy rules to control plane functions to enforce them, and may also support unified policy framework to govern network behavior. The PCF 156 may also implement a front end to access subscription information relevant for policy decisions in a UDR of the UDM 158. In addition to communicating with functions over reference points as shown, the PCF 156 exhibit an Npcf service-based interface.

The UDM 158 may handle subscription-related information to support the network entities' handling of communication sessions, and may store subscription data of UE 102. For example, subscription data may be communicated via an N8 reference point between the UDM 158 and the AMF 144. The UDM 158 may include two parts, an application front end and a UDR. The UDR may store subscription data and policy data for the UDM 158 and the PCF 156, and/or structured data for exposure and application data (including PFDs for application detection, application request information for multiple UEs 102) for the NEF 152. The Nudr service-based interface may be exhibited by the UDR 221 to allow the UDM 158, PCF 156, and NEF 152 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 158 may exhibit the Nudm service-based interface.

The AF 160 may provide application influence on traffic routing, provide access to NEF, and interact with the policy framework for policy control.

In some embodiments, the 5GC 140 may enable edge computing by selecting operator/3rd party services to be geographically close to a point that the UE 102 is attached to the network. This may reduce latency and load on the network. To provide edge-computing implementations, the 5GC 140 may select a UPF 148 close to the UE 102 and execute traffic steering from the UPF 148 to data network

136 via the N6 interface. This may be based on the UE subscription data, UE location, and information provided by the AF 160. In this way, the AF 160 may influence UPF (re)selection and traffic routing. Based on operator deployment, when AF 160 is considered to be a trusted entity, the network operator may permit AF 160 to interact directly with relevant NFs. Additionally, the AF 160 may exhibit an Naf service-based interface.

The data network 136 may represent various network operator services, Internet access, or third party services that may be provided by one or more servers including, for example, application/content server 138.

FIG. 2 schematically illustrates a wireless network 200 in accordance with various embodiments. The wireless network 200 may include a UE 202 in wireless communication with an AN 204. The UE 202 and AN 204 may be similar to, and substantially interchangeable with, like-named components described elsewhere herein.

The UE 202 may be communicatively coupled with the AN 204 via connection 206. The connection 206 is illustrated as an air interface to enable communicative coupling, and can be consistent with cellular communications protocols such as an LTE protocol or a 5G NR protocol operating at mmWave or sub-6 GHz frequencies.

The UE 202 may include a host platform 208 coupled with a modem platform 210. The host platform 208 may include application processing circuitry 212, which may be coupled with protocol processing circuitry 214 of the modem platform 210. The application processing circuitry 212 may run various applications for the UE 202 that source/sink application data. The application processing circuitry 212 may further implement one or more layer operations to transmit/receive application data to/from a data network. These layer operations may include transport (for example UDP) and Internet (for example, IP) operations.

The protocol processing circuitry 214 may implement one or more of layer operations to facilitate transmission or reception of data over the connection 206. The layer operations implemented by the protocol processing circuitry 214 may include, for example, MAC, RLC, PDCP, RRC and NAS operations.

The modem platform 210 may further include digital baseband circuitry 216 that may implement one or more layer operations that are "below" layer operations performed by the protocol processing circuitry 214 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 210 may further include transmit circuitry 218, receive circuitry 220, RF circuitry 222, and RF front end (RFFE) 224, which may include or connect to one or more antenna panels 226. Briefly, the transmit circuitry 218 may include a digital-to-analog converter, mixer, intermediate frequency (IF) components, etc.; the receive circuitry 220 may include an analog-to-digital converter, mixer, IF components, etc.; the RF circuitry 222 may include a low-noise amplifier, a power amplifier, power tracking components, etc.; RFFE 224 may include filters (for example, surface/bulk acoustic wave filters), switches, antenna tuners, beamforming components (for example, phase-array antenna components), etc. The selection and arrangement of the components of the transmit circuitry 218, receive circuitry 220, RF circuitry 222, RFFE 224, and antenna panels 226 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 214 may include one or more instances of control circuitry (not shown) to provide control functions for the transmit/receive components.

A UE reception may be established by and via the antenna panels 226, RFFE 224, RF circuitry 222, receive circuitry 220, digital baseband circuitry 216, and protocol processing circuitry 214. In some embodiments, the antenna panels 226 may receive a transmission from the AN 204 by receive-beamforming signals received by a plurality of antennas/antenna elements of the one or more antenna panels 226.

A UE transmission may be established by and via the protocol processing circuitry 214, digital baseband circuitry 216, transmit circuitry 218, RF circuitry 222, RFFE 224, and antenna panels 226. In some embodiments, the transmit components of the UE 204 may apply a spatial filter to the data to be transmitted to form a transmit beam emitted by the antenna elements of the antenna panels 226.

Similar to the UE 202, the AN 204 may include a host platform 228 coupled with a modem platform 230. The host platform 228 may include application processing circuitry 232 coupled with protocol processing circuitry 234 of the modem platform 230. The modem platform may further include digital baseband circuitry 236, transmit circuitry 238, receive circuitry 240, RF circuitry 242, RFFE circuitry 244, and antenna panels 246. The components of the AN 204 may be similar to and substantially interchangeable with like-named components of the UE 202. In addition to performing data transmission/reception as described above, the components of the AN 208 may perform various logical functions that include, for example, RNC functions such as radio bearer management, uplink and downlink dynamic radio resource management, and data packet scheduling.

FIG. 3 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 3 shows a diagrammatic representation of hardware resources 300 including one or more processors (or processor cores) 310, one or more memory/storage devices 320, and one or more communication resources 330, each of which may be communicatively coupled via a bus 340 or other interface circuitry. For embodiments where node virtualization (e.g., NFV) is utilized, a hypervisor 302 may be executed to provide an execution environment for one or more network slices/sub-slices to utilize the hardware resources 300.

The processors 310 may include, for example, a processor 312 and a processor 314. The processors 310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radiofrequency integrated circuit (RFIC), another processor (including those discussed herein), or any suitable combination thereof.

The memory/storage devices 320 may include main memory, disk storage, or any suitable combination thereof. The memory/storage devices 320 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 330 may include interconnection or network interface controllers, components, or other suitable devices to communicate with one or more peripheral devices 304 or one or more databases 306 or other network elements via a network 308. For example, the communication resources 330 may include wired communication components (e.g., for coupling via USB, Ethernet, etc.), cellular communication components, NFC components, Bluetooth® (or Bluetooth® Low Energy) components, Wi-Fi® components, and other communication components.

Instructions 350 may comprise software, a program, an application, an applet, an app, or other executable code for causing at least any of the processors 310 to perform any one or more of the methodologies discussed herein. The instructions 350 may reside, completely or partially, within at least one of the processors 310 (e.g., within the processor's cache memory), the memory/storage devices 320, or any suitable combination thereof. Furthermore, any portion of the instructions 350 may be transferred to the hardware resources 300 from any combination of the peripheral devices 304 or the databases 306. Accordingly, the memory of processors 310, the memory/storage devices 320, the peripheral devices 304, and the databases 306 are examples of computer-readable and machine-readable media.

Example Procedures

Figure 4:
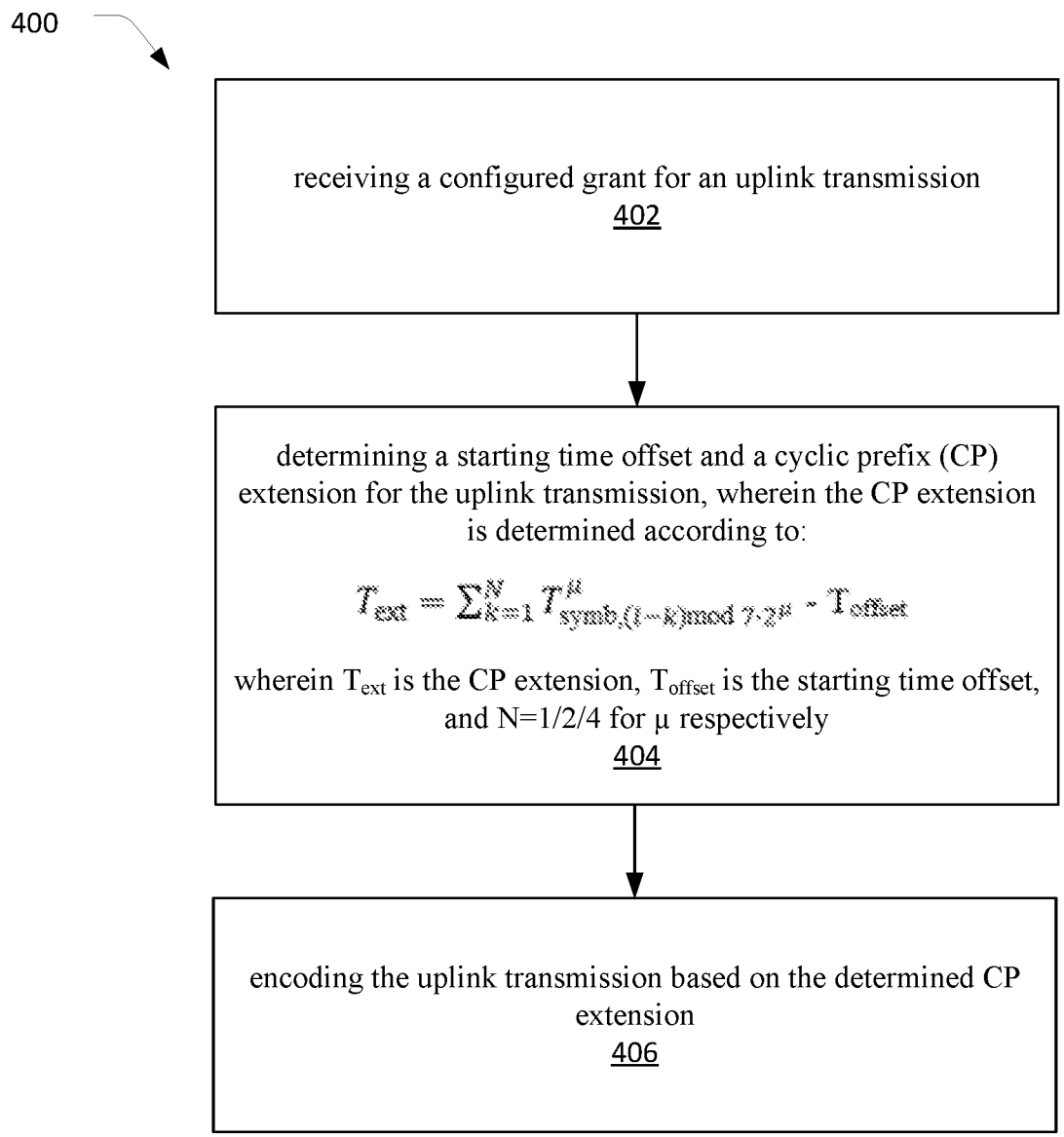
FIG. 4 is a flowchart of an example process that may be performed by a user equipment (UE), in accordance with various embodiments.

In some embodiments, the electronic device(s), network(s), system(s), chip(s) or component(s), or portions or implementations thereof, of FIGS. 1-3, or some other figure herein, may be configured to perform one or more processes, techniques, or methods as described herein, or portions thereof. One such process 400 is depicted in FIG. 4. In some embodiments, the process 400 may be performed by a UE (e.g., UE 102 and/or 202) or a portion thereof.

For example, the process 400 may include, at 402, receiving a configured grant for an uplink transmission.

At 404, the process 400 may further include determining a starting time offset and a cyclic prefix (CP) extension for the uplink transmission, wherein the CP extension is determined according to:

$$T_{ext} = \sum_{k=1}^{N} T^{\mu}_{symb,(l-k) \bmod 7\cdot 2^{\mu}} - T_{offset},$$

wherein $T_{ext}$ is the CP extension, $T_{offset}$ is the starting time offset, and N=1/2/4 for µ=0/1/2, respectively. The value µ may correspond to the subcarrier spacing (SCS) of the configured grant/PUSCH. For example, in some embodiments, µ is 0 for SCS of 15 kHz, µ is 1 for SCS of 30 kHz, and µ is 2 for SCS of 60 kHz.

At 406, the process 400 may further include encoding the uplink transmission based on the determined CP extension.

Figure 5:
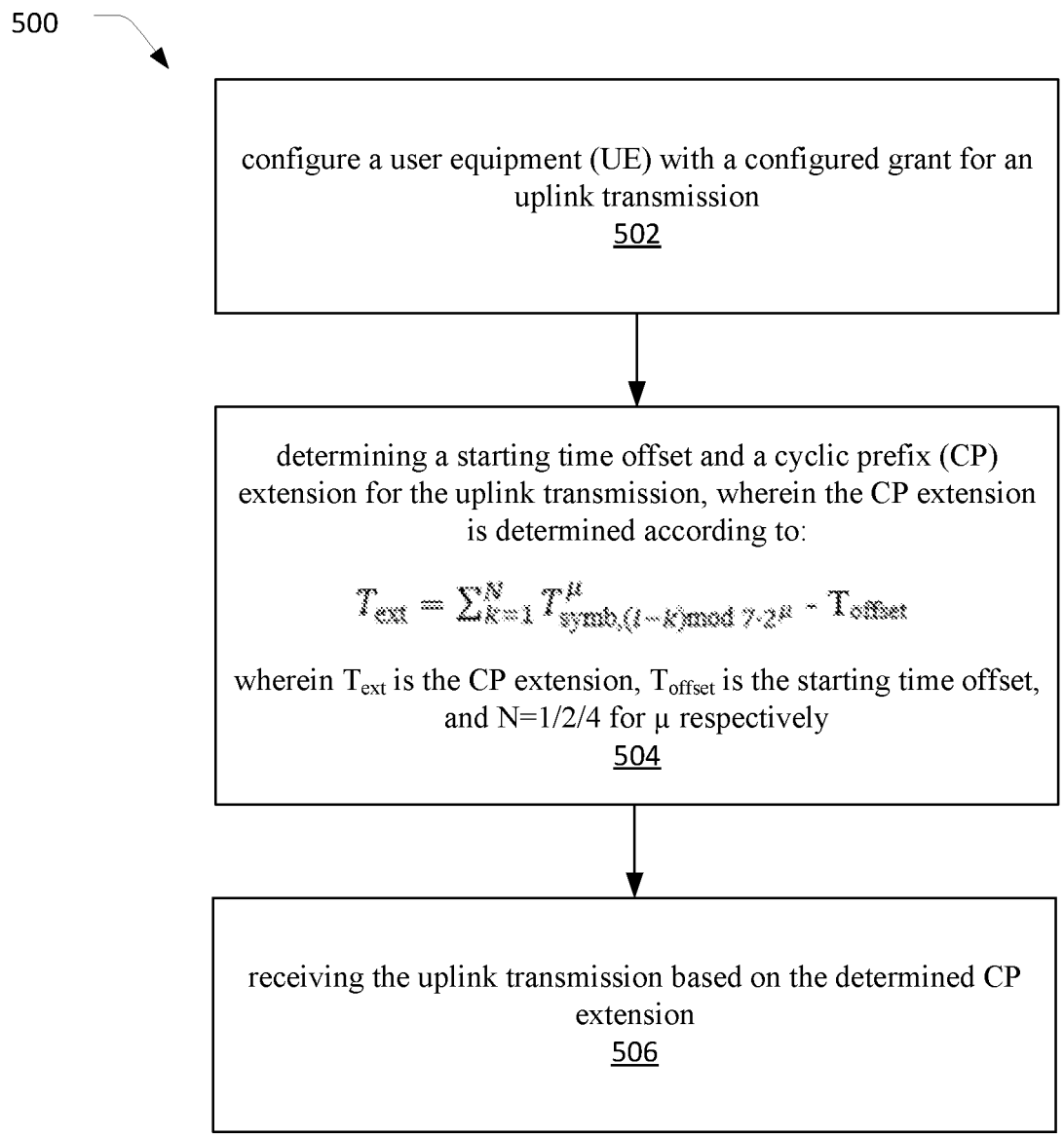
FIG. 5 is a flowchart of an example process that may be performed by an access node (AN), such as a next generation Node B (gNB), in accordance with various embodiments.

FIG. 5 illustrates another process 500 in accordance with various embodiments. In some embodiments, the process 500 may be performed by an Access Node (e.g., AN 108 and/or 204) or a portion thereof. For example, the process 500 may include, at 502, configuring a user equipment (UE) with a configured grant for an uplink transmission.

At 504, the process 500 may further include determining a starting time offset and a cyclic prefix (CP) extension for the uplink transmission, wherein the CP extension is determined according to:

$$T_{ext} = \sum_{k=1}^{N} T^{\mu}_{symb,(l-k) \bmod 7\cdot 2^{\mu}} - T_{offset},$$

wherein $T_{ext}$ is the CP extension, $T_{offset}$ is the starting time offset, and N=1/2/4 for µ=0/1/2, respectively. The value µ may correspond to the subcarrier spacing (SCS) of the configured grant/PUSCH. For example, in some embodiments, µ is 0 for SCS of 15 kHz, µ is 1 for SCS of 30 kHz, and µ is 2 for SCS of 60 kHz.

At 506, the process 500 may further include receiving the uplink transmission based on the determined CP extension.

Figure 6:
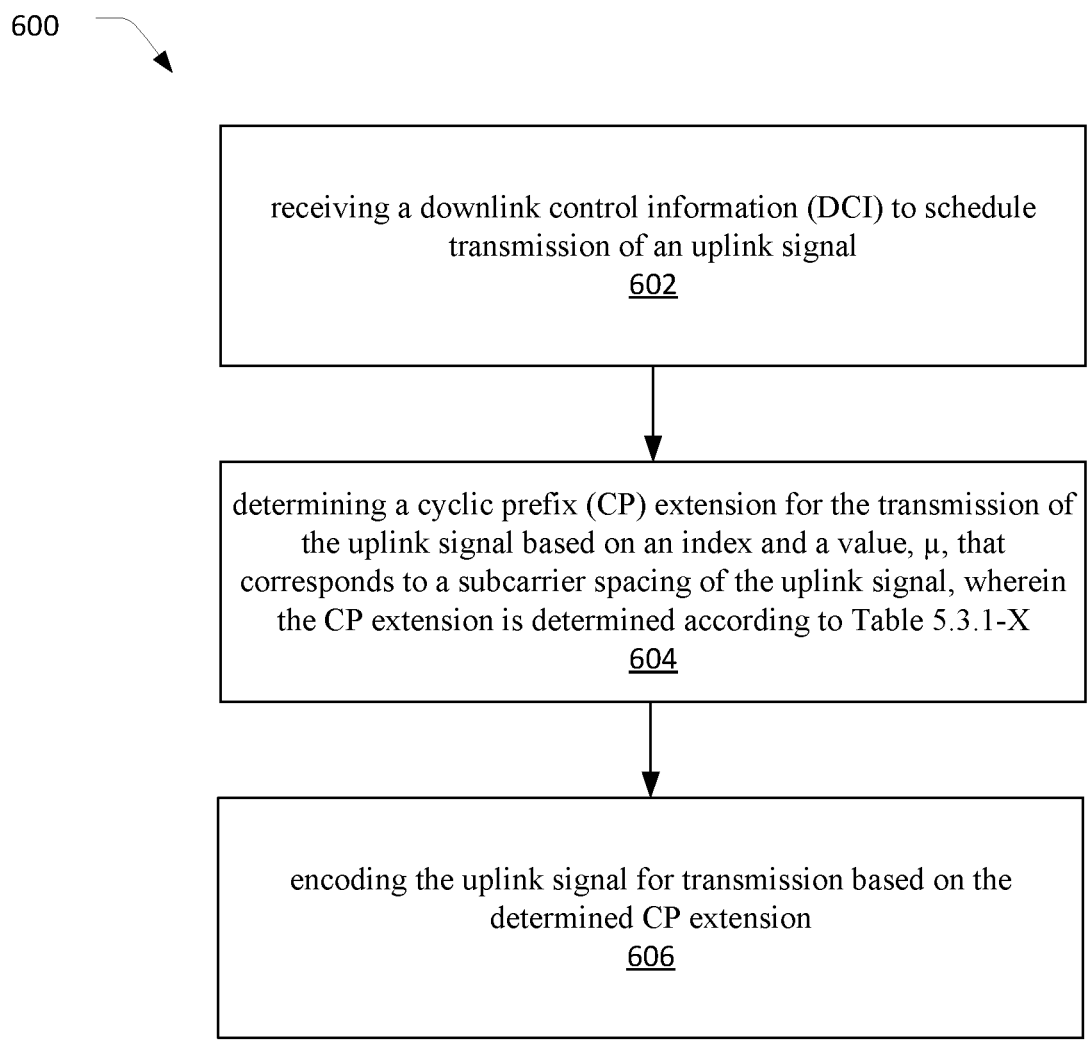
FIG. 6 is a flowchart of another example process that may be performed by a UE, in accordance with various embodiments.

FIG. 6 illustrates another process 600 in accordance with various embodiments. The process 600 may be performed by a UE (e.g., UE 102 and/or 202) or a portion thereof.

At 602, the process 600 may include receiving a downlink control information (DCI) to schedule transmission of an uplink signal.

At 604, the process 600 may further include determining a cyclic prefix (CP) extension for the transmission of the uplink signal based on an index and a value, µ, that corresponds to a subcarrier spacing of the uplink signal, wherein the CP extension is determined according to Table 5.3.1-X (provided above).

At 606, the process 600 may further include encoding the uplink signal for transmission based on the determined CP extension. The uplink signal may be, for example, a PUSCH, an SRS, and/or a PUCCH.

Figure 7:
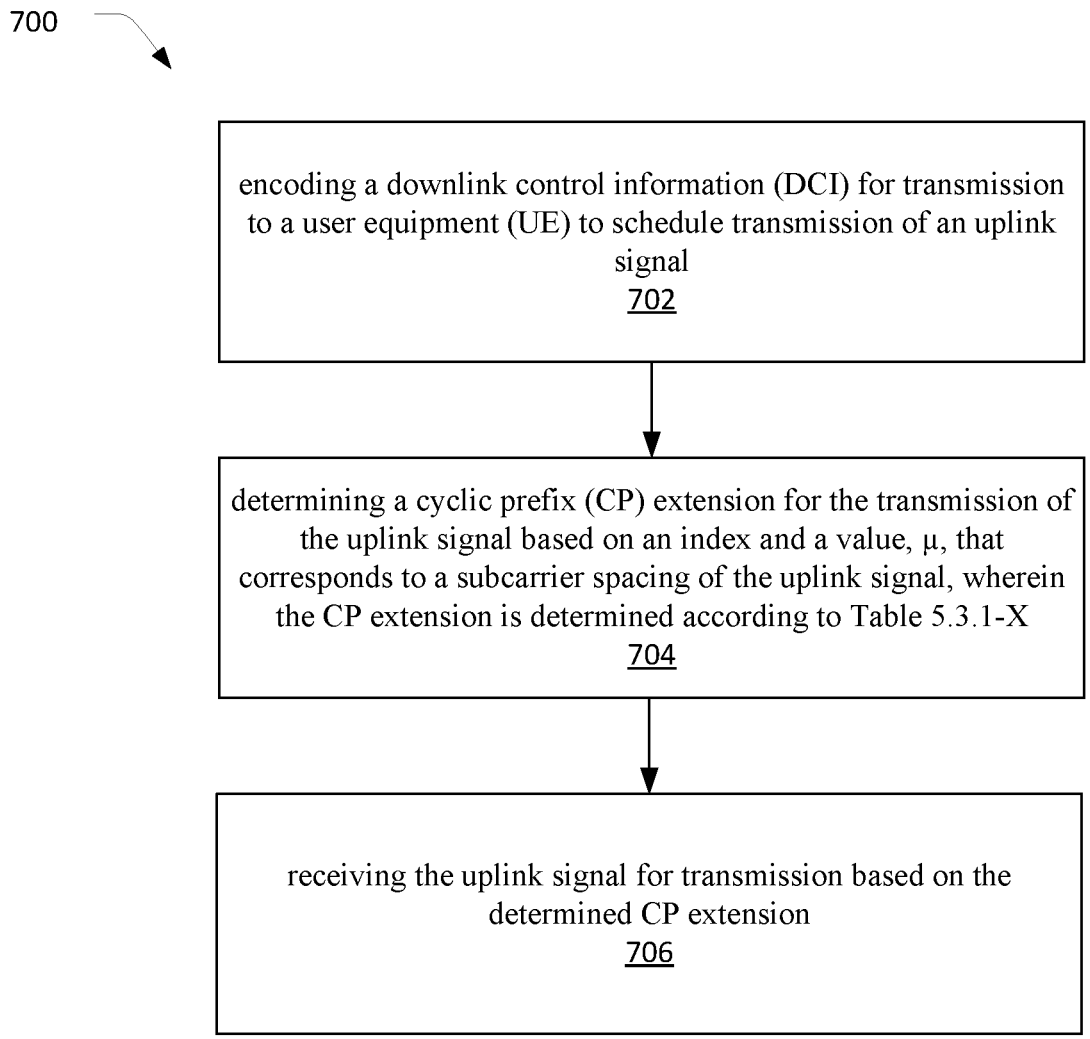
FIG. 7 is a flowchart of another example process that may be performed by an AN, such as a gNB, in accordance with various embodiments.

FIG. 7 illustrates another process 700 in accordance with various embodiments. In some embodiments, the process 700 may be performed by an Access Node (e.g., AN 108 and/or 204) or a portion thereof.

At 702, the process 700 may include encoding a downlink control information (DCI) for transmission to a user equipment (UE) to schedule transmission of an uplink signal.

At 704, the process 700 may further include determining a cyclic prefix (CP) extension for the transmission of the uplink signal based on an index and a value, µ, that corresponds to a subcarrier spacing of the uplink signal, wherein the CP extension is determined according to Table 5.3.1-X (provided above).

At 706, the process 700 may further include receiving the uplink signal for transmission based on the determined CP extension. The uplink signal may be, for example, a PUSCH, an SRS, and/or a PUCCH.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 may include a new definition for 25 us CAT2 LBT for both UE and gNB.

Example 2 may include channel Access Type and CP extension in DCI 0_0 and DCI 1_0 for FBE operation.

Example 3 may include channel Access Type and CP extension in DCI 1_1 and DCI 0_1 for FBE operation.

Example 4 may include min and max values for C2 and C3, which are CP extension values that take TA into account for 16 us and 25 us, respectively.

Example 5 may include CWS adjustment enhancements for DFI based feedback in configured grant.

Example 6 may include CWS adjustment enhancements for non-DFI based feedback in configured grant.

Example 7 may include a method comprising:
sensing for a signal on a channel of unlicensed spectrum for a sensing slot of 9 microseconds within a sensing interval of 25 microseconds;
determining, based on the sensing, that the channel is idle; and
transmitting or causing to transmit on the channel based on the determination.

Example 8 may include the method of example 7 or some other example herein, wherein the sensing slot is at an end of the sensing interval.

Example 9 may include the method of example 7-8 or some other example herein, further comprising receiving a downlink control information (DCI) that includes an indicator to indicate a channel access mode and a cyclic prefix extension for use to access the channel.

Example 10 may include the method of example 9 or some other example herein, wherein the cyclic prefix extension is C3*symbol length—25 us—TA, where TA is a timing advance.

Example 11 may include the method of example 10 or some other example herein, further comprising receiving a radio resource control (RRC) message to configure a value of C3.

Example 12 may include the method of example 10-11 or some other example herein, wherein the value of C3 is an integer from 1 to 29.

Example 13 may include the method of example 12 or some other example herein, wherein a subcarrier spacing of the channel is 15 kHz or 30 kHz.

Example 14 may include the method of example 10-11 or some other example herein, wherein the value of C3 is an integer from 2 to 30.

Example 15 may include the method of example 14 or some other example herein, wherein a subcarrier spacing of the channel is 60 kHz.

Example 16 may include the method of example 9 or some other example herein, wherein the cyclic prefix extension is C1*symbol length—25 us.

Example 17 may include the method of example 16 or some other example herein, further comprising receiving an RRC message to configure a value of C1.

Example 18 may include the method of example 9-17 or some other example herein, wherein the DCI has a DCI format 0_0 or 1_0.

Example 19 may include the method of example 9-17 or some other example herein, wherein the DCI has a DCI format 0_1.

Example 20 may include the method of example 7-19 or some other example herein, wherein the method is performed by a UE or a portion thereof.

Example 21 may include a method comprising:
sensing for a signal on a channel of unlicensed spectrum for a sensing slot of 9 microseconds within a sensing interval of 25 microseconds;
determining, based on the sensing, that the channel is idle; and
transmitting or causing to transmit a downlink signal to a user equipment (UE) on the channel based on the determination.

Example 22 may include the method of example 21 or some other example herein, wherein the sensing slot is at an end of the sensing interval.

Example 23 may include the method of example 21-22 or some other example herein, further comprising transmitting or causing transmission of a downlink control information (DCI) to the UE, wherein the DCI includes an indicator to indicate a channel access mode and a cyclic prefix extension for use to access the channel.

Example 24 may include the method of example 23 or some other example herein, wherein the cyclic prefix extension is C3*symbol length—25 us—TA, where TA is a timing advance.

Example 25 may include the method of example 24 or some other example herein, further comprising transmitting or causing transmission of a radio resource control (RRC) message to the UE to configure a value of C3.

Example 26 may include the method of example 24-25 or some other example herein, wherein the value of C3 is an integer from 1 to 29.

Example 27 may include the method of example 26 or some other example herein, wherein a subcarrier spacing of the channel is 15 kHz or 30 kHz.

Example 28 may include the method of example 24-25 or some other example herein, wherein the value of C3 is an integer from 2 to 30.

Example 29 may include the method of example 28 or some other example herein, wherein a subcarrier spacing of the channel is 60 kHz.

Example 30 may include the method of example 23 or some other example herein, wherein the cyclic prefix extension is C1*symbol length—25 us.

Example 31 may include the method of example 30 or some other example herein, further comprising transmitting or causing transmission of an RRC message to configure a value of C1.

Example 32 may include the method of example 23-31 or some other example herein, wherein the DCI has a DCI format 0_0 or 1_0.

Example 33 may include the method of example 23-31 or some other example herein, wherein the DCI has a DCI format 0_1.

Example 34 may include the method of example 21-33 or some other example herein, wherein the method is performed by a gNB or an eNB or a portion thereof.

Example 35 may include a method comprising:
sensing for activity on a channel of unlicensed spectrum for a sensing slot of 9 microseconds within a sensing interval of 25 microseconds;

determining, based on the sensing, that the channel is idle; and transmitting or causing to transmit a signal on the channel based on the determination.

Example 36 may include the method of example 35, wherein the signal is an uplink signal.

Example 37 may include the method of example 35-36 or some other example herein, wherein the sensing slot is at an end of the sensing interval.

Example 38 may include the method of example 35-37 or some other example herein, further comprising receiving a downlink control information (DCI) to the UE, wherein the DCI includes an indicator to indicate a channel access mode and a cyclic prefix extension for use to access the channel.

Example 39 may include the method of example 38 or some other example herein, wherein the cyclic prefix extension is C3*symbol length—25 us—TA, where TA is a timing advance.

Example 40 may include the method of example 38 or some other example herein, further comprising receiving a radio resource control (RRC) message to configure a value of C3.

Example 41 may include the method of example 39-40 or some other example herein, wherein the value of C3 is an integer from 1 to 29.

Example 42 may include the method of example 41 or some other example herein, wherein a subcarrier spacing of the channel is 15 kHz or 30 kHz.

Example 43 may include the method of example 39-40 or some other example herein, wherein the value of C3 is an integer from 2 to 30.

Example 44 may include the method of example 43 or some other example herein, wherein a subcarrier spacing of the channel is 60 kHz.

Example 45 may include the method of example 38 or some other example herein, wherein the cyclic prefix extension is C1*symbol length—25 us.

Example 46 may include the method of example 45 or some other example herein, further comprising receiving an RRC message to configure a value of C1.

Example 47 may include the method of example 38-46 or some other example herein, wherein the DCI has a DCI format 0_0 or 1_0.

Example 48 may include the method of example 38-46 or some other example herein, wherein the DCI has a DCI format 0_1.

Example 49 may include the method of example 35-48 or some other example herein, wherein the method is performed by a UE or a portion thereof.

Example 50 may include a method comprising:

determining a starting time offset and a cyclic prefix (CP) extension for a beginning of a transmission burst with CG resources;

transmitting or causing transmission of the transmission burst based on the starting time offset and CP extension, wherein the CP extension is determined according to:

$$T_{ext} = \sum_{k=1}^{N} T^{\mu}_{symb,(l-k) \bmod 7 \cdot 2^{\mu}} - T_{offset}$$

wherein $T_{ext}$ is the CP extension, $T_{offset}$ is the starting time offset, and N=1/2/4 for μ=0/1/2 respectively.

Example 51 may include the method of example 50 or some other example herein, wherein $T_{offset}$ includes one or more of the following sets of values:

{16, 25, 34, 43, 52, 61, 70}

$$\circ \left\{ 16, 25, 34, 43, 52, 61, \sum_{k=1}^{N} T^{\mu}_{symb,(l-k) \bmod 7 \cdot 2^{\mu}} \right\}$$

{16, 25, 34, 43, 52, 61, OS1 @ 15 KHz}.

Example 52 may include the method of example 50-51 or some other example herein, wherein the method is performed by a UE or a gNB or a portion thereof.

Example 53 may include a method comprising:

determining a cyclic prefix (CP) extension for a transmission on unlicensed spectrum, wherein the CP extension, $T'_{ext}$, is determined as a largest integer value of $C_i$, where i∈{2,3}, that fulfils the following equation: $0 \leq T'_{ext} < T_{symb,0}^{\mu}$.

transmitting, causing transmission of, receiving, or causing receipt of the transmission based on the CP extension.

Example 54 may include the method of example 53 or some other example herein, wherein the determined CP extension is for contention-based random access or in absence of higher-layer configuration.

Example 55 may include the method of example 53-54 or some other example herein, further comprising:

sensing for a signal on a channel of the unlicensed spectrum for a sensing slot of 9 microseconds within a sensing interval of 25 microseconds;

determining, based on the sensing, that the channel is idle; and transmitting or causing transmission of the transmission based on the CP extension.

Example 56 may include the method of example 53-55 or some other example herein, wherein the method is performed by a UE or a gNB or a portion thereof.

Example 57 may include a method comprising:

determining a cyclic prefix (CP) extension for a transmission on unlicensed spectrum, wherein the CP extension, $T'_{ext}$, is determined as a smallest integer value of $C_i$, where i∈{2,3}, that fulfils the following equation: $0 \leq T'_{ext} < T_{symb,0}^{\mu}$.

transmitting, causing transmission of, receiving, or causing receipt of the transmission based on the CP extension.

Example 58 may include the method of example 57 or some other example herein, wherein the determined CP extension is for contention-based random access or in absence of higher-layer configuration.

Example 59 may include the method of example 57-58 or some other example herein, further comprising:

sensing for a signal on a channel of the unlicensed spectrum for a sensing slot of 9 microseconds within a sensing interval of 25 microseconds;

determining, based on the sensing, that the channel is idle; and transmitting or causing transmission of the transmission based on the CP extension.

Example 60 may include the method of example 57-59 or some other example herein, wherein the method is performed by a UE or a gNB or a portion thereof.

Example 61 may include a method comprising:

determining a cyclic prefix (CP) extension for a transmission on unlicensed spectrum, wherein the CP extension, $T'_{ext}$, is determined as a largest integer value of $C_i$, where $i \in \{2,3\}$, that fulfills the following equation: $0 \leq T'_{ext} < T_{symb, (l-Ci) mod\ 7\cdot 2^\mu}$ or $T'_{ext} < T_{symb, (l-Ci) mod\ 7\cdot 2^\mu}$;

transmitting, causing transmission of, receiving, or causing receipt of the transmission based on the CP extension.

Example 62 may include the method of example 61 or some other example herein, wherein the determined CP extension is for contention-based random access or in absence of higher-layer configuration.

Example 63 may include the method of example 61-62 or some other example herein, wherein the CP extension is determined as the largest integer value of Ci, where $i \in \{2,3\}$, that fulfils the following equation: $0 \leq T'_{ext} < T_{symb, (l-Ci) mod\ 7 \cdot 2^\mu}$.

Example 64 may include the method of example 61-62 or some other example herein, wherein the CP extension is determined as the largest integer value of $C_i$, where $i \in \{2,3\}$, that fulfils the following equation: $T'_{ext} < T_{symb, (l-Ci) mod\ 7 \cdot 2^\mu}$.

Example 65 may include the method of example 61-64 or some other example herein, further comprising:

sensing for a signal on a channel of the unlicensed spectrum for a sensing slot of 9 microseconds within a sensing interval of 25 microseconds;

determining, based on the sensing, that the channel is idle; and transmitting or causing transmission of the transmission based on the CP extension.

Example 66 may include the method of example 61-65 or some other example herein, wherein the method is performed by a UE or a gNB or a portion thereof.

Example X1 may include one or more non-transitory, computer-readable media (NTCRM) having instructions, stored thereon, that when executed by one or more processors cause a user equipment to: receive a configured grant for an uplink transmission; determine a starting time offset and a cyclic prefix (CP) extension for the uplink transmission, wherein the CP extension is determined according to:

$$T_{ext} = \sum_{k=1}^{N} T^\mu_{symb,(l-k)\ mod\ 7 \cdot 2^\mu} - T_{offset},$$

wherein $T_{ext}$ is the CP extension, $T_{offset}$ is the starting time offset, l is a first symbol allocated for the uplink transmission, and N=1/2/4 for µ=0/1/2, respectively; and encode the uplink transmission based on the CP extension;

Example X2 may include the one or more NTCRM of Example X1, wherein µ corresponds to a subcarrier spacing of the uplink transmission.

Example X3 may include the one or more NTCRM of Example X1, wherein the instructions, when executed, are further to cause the UE to determine a value of the starting time offset based on an index.

Example X4 may include the one or more NTCRM of Example X3, wherein the value of the starting time offset is determined from among a set of values that includes: 16, 25, 34, 43, 52, and 61 microseconds.

Example X5 may include the one or more NTCRM of Example X4, wherein the set of values further includes $$\sum_{k=1}^{N} T^\mu_{symb,(l-k)\ mod\ 7 \cdot 2^\mu}$$

microseconds.

Example X6 may include the one or more NTCRM of Example X1, wherein the uplink transmission is a physical uplink shared channel (PUSCH) transmission.

Example X7 may include the one or more NTCRM of Example X1, wherein the configured grant is for unlicensed spectrum.

Example X8 may include one or more non-transitory, computer-readable media (NTCRM) having instructions, stored thereon, that when executed by one or more processors cause a next generation Node B (gNB) to: configure a user equipment (UE) with a configured grant for an uplink transmission; determine a starting time offset and a cyclic prefix (CP) extension for the uplink transmission, wherein the CP extension is determined according to:

$$T_{ext} = \sum_{k=1}^{N} T^\mu_{symb,(l-k)\ mod\ 7 \cdot 2^\mu} - T_{offset}$$

wherein $T_{ext}$ is the CP extension, $T_{offset}$ is the starting time offset, l is a first symbol allocated for the uplink transmission, and N=1/2/4 for µ=0/1/2, respectively; and receive the uplink transmission from the UE based on the CP extension.

Example X9 may include the one or more NTCRM of Example X8, wherein µ corresponds to a subcarrier spacing of the uplink transmission.

Example X10 may include the one or more NTCRM of Example X8, wherein the instructions, when executed, are further to cause the gNB to determine a value of the starting time offset based on an index.

Example X11 may include the one or more NTCRM of Example X10, wherein the value of the starting time offset is determined from among a set of values that includes: 16, 25, 34, 43, 52, and 61 microseconds.

Example X12 may include the one or more NTCRM of Example X11, wherein the set of values further includes $$\sum_{k=1}^{N} T^\mu_{symb,(l-k)\ mod\ 7 \cdot 2^\mu}$$

microseconds.

Example X13 may include the one or more NTCRM of Example X8, wherein the uplink transmission is a physical uplink shared channel (PUSCH) transmission.

Example X14 may include the one or more NTCRM of Example X8, wherein the configured grant is for unlicensed spectrum.

Example X15 may include one or more non-transitory, computer-readable media (NTCRM) having instructions, stored thereon, that when executed by one or more processors case a user equipment (UE) to: receive a downlink control information (DCI) to schedule transmission of an uplink signal; determine a cyclic prefix (CP) extension for the transmission of the uplink signal based on an index and a value, µ, that corresponds to a subcarrier spacing of the uplink signal, wherein the CP extension is determined according to:

| Index | $\mu = 0$ | $\mu = 1$ | $\mu = 2$ |
| --- | --- | --- | --- |
| 0 | — | — | — |
| 1 | $T_{symb,l}^{\mu} - 25 \cdot 10^{-6}$ | $T_{symb,l}^{\mu} - 25 \cdot 10^{-6}$ | $\sum_{k=1}^{2} T_{symb,mod(l-k,7\cdot2^{\mu})}^{\mu} - 25 \cdot 10^{-6}$ |
| 2 | $\sum_{k=1}^{C_2} T_{symb,mod(l-k,7\cdot2^{\mu})}^{\mu} - 16 \cdot 10^{-6} - T_{TA}$ | $\sum_{k=1}^{C_2} T_{symb,mod(l-k,7\cdot2^{\mu})}^{\mu} - 16 \cdot 10^{-6} - T_{TA}$ | $\sum_{k=1}^{C_2} T_{symb,mod(l-k,7\cdot2^{\mu})}^{\mu} - 16 \cdot 10^{-6} - T_{TA}$ |
| 3 | $\sum_{k=1}^{C_3} T_{symb,mod(l-k,7\cdot2^{\mu})}^{\mu} - 25 \cdot 10^{-6} - T_{TA}$ | $\sum_{k=1}^{C_3} T_{symb,mod(l-k,7\cdot2^{\mu})}^{\mu} - 25 \cdot 10^{-6} - T_{TA}$ | $\sum_{k=1}^{C_3} T_{symb,mod(l-k,7\cdot2^{\mu})}^{\mu} - 25 \cdot 10^{-6} - T_{TA}$ | wherein:

C2 and C3 are numerical values;

l is a first symbol allocated for the uplink signal; and $T_{TA}$ is a timing advance; and encode the uplink signal for transmission based on the determined CP extension.

Example X16 may include the one or more NTCRM of Example X15, wherein the instructions, when executed, are further to cause the UE to receive a radio resource control (RRC) message to indicate the values of C2 and C3.

Example X17 may include the one or more NTCRM of Example X15, wherein the instructions, when executed, are further to cause the UE to determine the value of C2 or C3 as a largest integer that fulfills $T'_{ext} < T_{symb\ (l-1)mod\ 7\cdot2^{\mu}}$.

Example X18 may include the one or more NTCRM of Example X17, wherein the value of C2 or C3 is determined as the largest integer that fulfills $T'_{ext} < T_{symb,\ (l-1)mod\ 7\cdot2^{\mu}}$ for contention-based random access or if values of C2 and C3 are not configured for the UE.

Example X19 may include the one or more NTCRM of Example X15, wherein the uplink signal is a physical uplink shared channel (PUSCH), a sounding reference signal (SRS), or a physical uplink control channel (PUCCH).

Example Z01 may include an apparatus comprising means to perform one or more elements of a method described in or related to any of examples 1-66, X1-X19, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-66, X1-X19, or any other method or process described herein.

Example Z03 may include an apparatus comprising logic, modules, or circuitry to perform one or more elements of a method described in or related to any of examples 1-66, X1-X19, or any other method or process described herein.

Example Z04 may include a method, technique, or process as described in or related to any of examples 1-66, X1-X19, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-66, X1-X19, or portions thereof.

Example Z06 may include a signal as described in or related to any of examples 1-66, X1-X19, or portions or parts thereof.

Example Z07 may include a datagram, packet, frame, segment, protocol data unit (PDU), or message as described in or related to any of examples 1-66, X1-X19, or portions or parts thereof, or otherwise described in the present disclosure.

Example Z08 may include a signal encoded with data as described in or related to any of examples 1-66, X1-X19, or portions or parts thereof, or otherwise described in the present disclosure.

Example Z09 may include a signal encoded with a datagram, packet, frame, segment, protocol data unit (PDU), or message as described in or related to any of examples 1-66, X1-X19, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-66, X1-X19, or portions thereof.

Example Z11 may include a computer program comprising instructions, wherein execution of the program by a processing element is to cause the processing element to carry out the method, techniques, or process as described in or related to any of examples 1-66, X1-X19, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

3GPP Third Generation Partnership Project
4G Fourth Generation
5G Fifth Generation
5GC 5G Core network
ACK Acknowledgement
AF Application Function
AM Acknowledged Mode
AMBR Aggregate Maximum Bit Rate
AMF Access and Mobility Management Function
AN Access Network
ANR Automatic Neighbour Relation
AP Application Protocol, Antenna Port, Access Point
API Application Programming Interface
APN Access Point Name
ARP Allocation and Retention Priority
ARQ Automatic Repeat Request
AS Access Stratum CIR Carrier to Interference Ratio
CK Cipher Key
CM Connection Management, Conditional Mandatory
CMAS Commercial Mobile Alert Service
CMD Command
CMS Cloud Management System
CO Conditional Optional
CoMP Coordinated Multi-Point
CORESET Control Resource Set
COTS Commercial Off-The-Shelf
CP Control Plane, Cyclic Prefix, Connection Point
CPD Connection Point Descriptor
CPE Customer Premise Equipment
CPICH Common Pilot Channel
CQI Channel Quality Indicator DM-RS, DMRS Demodulation Reference Signal
DN Data network
DRB Data Radio Bearer
DRS Discovery Reference Signal
DRX Discontinuous Reception
DSL Domain Specific Language. Digital Subscriber Line
DSLAM DSL Access Multiplexer
DwPTS Downlink Pilot Time Slot
E-LAN Ethernet Local Area Network
E2E End-to-End ASN.1 Abstract Syntax Notation One
AUSF Authentication Server Function
AWGN Additive White Gaussian Noise
BAP Backhaul Adaptation Protocol
BCH Broadcast Channel
BER Bit Error Ratio
BFD Beam Failure Detection
BLER Block Error Rate
BPSK Binary Phase Shift Keying
BRAS Broadband Remote Access Server
BSS Business Support System
BS Base Station
BSR Buffer Status Report
BW Bandwidth
BWP Bandwidth Part
C-RNTI Cell Radio Network Temporary Identity
CA Carrier Aggregation, CPU CSI processing unit, Central Processing Unit
C/R Command/Response field bit
CRAN Cloud Radio Access Network, Cloud RAN
CRB Common Resource Block
CRC Cyclic Redundancy Check
CRI Channel-State Information Resource Indicator, CSI-RS Resource Indicator
C-RNTI Cell RNTI
CS Circuit Switched
CSAR Cloud Service Archive
CSI Channel-State Information
CSI-IM CSI Interference Measurement
CSI-RS CSI Reference Signal
CSI-RSRP CSI reference signal received power Management Function
EGPRS Enhanced GPRS
EIR Equipment Identity Register
eLAA enhanced Licensed Assisted Access, enhanced LAA
EM Element Manager
eMBB Enhanced Mobile Broadband
EMS Element Management System
eNB evolved NodeB, E-UTRAN Node B
EN-DC E-UTRA-NR Dual Connectivity Certification Authority
CAPEX CAPital EXpenditure
CBRA Contention Based Random Access
CC Component Carrier, Country Code, Cryptographic Checksum
CCA Clear Channel Assessment
CCE Control Channel Element
CCCH Common Control Channel
CE Coverage Enhancement
CDM Content Delivery Network
CDMA Code-Division Multiple Access
CFRA Contention Free Random Access
CG Cell Group
CI Cell Identity
CID Cell-ID (e.g., positioning method)
CIM Common Information Model
CSI-RSRQ CSI reference signal received quality
CSI-SINR CSI signal-to-noise and interference ratio
CSMA Carrier Sense Multiple Access
CSMA/CA CSMA with collision avoidance
CSS Common Search Space, Cell- specific Search Space
CTS Clear-to-Send
CW Codeword
CWS Contention Window Size
D2D Device-to-Device
DC Dual Connectivity, Direct Current
DCI Downlink Control Information
DF Deployment Flavour
DL Downlink
DMTF Distributed Management Task Force
DPDK Data Plane Development Kit EREG enhanced REG, enhanced resource element groups
ETSI European Telecommunications Standards Institute
ETWS Earthquake and Tsunami Warning System
eUICC embedded UICC, embedded Universal Integrated Circuit Card
E-UTRA Evolved UTRA
E-UTRAN Evolved UTRAN
EV2X Enhanced V2X
F1AP F1 Application Protocol -continued

| | | |
|---|---|---|
| ECCA extended clear channel assessment, extended CCA | EPC Evolved Packet Core | F1-C F1 Control plane interface |
| ECCE Enhanced Control Channel Element, Enhanced CCE | EPDCCH enhanced PDCCH, enhanced Physical Downlink Control Cannel | F1-U F1 User plane interface FACCH Fast Associated Control CHannel |
| ED Energy Detection | EPRE Energy per resource element | |
| EDGE Enhanced Datarates for GSM Evolution (GSM Evolution) | EPS Evolved Packet System | FACCH/F Fast Associated Control Channel/Full rate |
| EGMF Exposure Governance | | |
| FACCH/H Fast Associated Control Channel/Half rate | FN Frame Number FPGA Field-Programmable Gate Array | GNSS Global Navigation Satellite System GPRS General Packet Radio Service |
| FACH Forward Access Channel | FR Frequency Range | GSM Global System for Mobile Communications, Groupe Spécial Mobile |
| FAUSCH Fast Uplink Signalling Channel | G-RNTI GERAN Radio Network Temporary Identity | |
| FB Functional Block | | |
| FBI Feedback Information | GERAN GSM EDGE RAN, GSM EDGE Radio Access Network | |
| FCC Federal Communications Commission | | GTP GPRS Tunneling Protocol GTP-UGPRS Tunnelling Protocol for User Plane |
| FCCH Frequency Correction CHannel | GGSN Gateway GPRS Support Node GLONASS GLObal'naya NAvigatsionnaya Sputnikovaya Sistema (Engl.: Global Navigation Satellite System) | |
| FDD Frequency Division Duplex | | GTS Go To Sleep Signal (related to WUS) GUMMEI Globally Unique MME Identifier GUTI Globally Unique Temporary UE Identity |
| FDM Frequency Division Multiplex | | |
| FDMA Frequency Division Multiple Access | | |
| FE Front End | gNB Next Generation NodeB | HARQ Hybrid ARQ, Hybrid Automatic Repeat Request |
| FEC Forward Error Correction | | |
| FFS For Further Study | gNB-CU gNB-centralized unit, Next Generation NodeB centralized unit | HANDO Handover HFN HyperFrame Number |
| FFT Fast Fourier Transformation | | |
| feLAA further enhanced Licensed Assisted Access, further enhanced LAA | gNB-DU gNB-distributed unit, Next Generation NodeB distributed unit | HHO Hard Handover HLR Home Location Register HN Home Network HO Handover |
| HPLMN Home Public Land Mobile Network | IDFT Inverse Discrete Fourier Transform IE Information element | IMPU IP Multimedia PUblic identity IMS IP Multimedia Subsystem |
| HSDPA High Speed Downlink Packet Access | IBE In-Band Emission | IMSI International Mobile Subscriber Identity |
| HSN Hopping Sequence Number | IEEE Institute of Electrical and Electronics Engineers | IoT Internet of Things IP Internet Protocol |
| HSPA High Speed Packet Access | IEI Information Element Identifier | Ipsec IP Security, Internet Protocol Security |
| HSS Home Subscriber Server | IEIDL Information Element Identifier Data Length | |
| HSUPA High Speed Uplink Packet Access | | IP-CAN IP-Connectivity Access Network |
| HTTP Hyper Text Transfer Protocol | IETF Internet Engineering Task Force | IP-M IP Multicast IPv4 Internet Protocol Version 4 |
| HTTPS Hyper Text Transfer Protocol Secure (https is http/1.1 over SSL, i.e. port 443) | IF Infrastructure IM Interference Measurement, Intermodulation, IP Multimedia | IPv6 Internet Protocol Version 6 IR Infrared IS In Sync |
| I-Block Information Block | IMC IMS Credentials | IRP Integration Reference Point |
| ICCID Integrated Circuit Card Identification | IMEI International Mobile Equipment Identity | ISDN Integrated Services Digital Network |
| IAB Integrated Access and Backhaul | IMGI International mobile group identity | ISIM IM Services Identity Module |
| ICIC Inter-Cell Interference Coordination | IMPI IP Multimedia Private Identity | ISO International Organisation for Standardisation |
| ID Identity, identifier | | |
| ISP Internet Service Provider | L2 Layer 2 (data link layer) | LWIP LTE/WLAN Radio Level Integration with IPsec Tunnel |
| IWF Interworking-Function | L3 Layer 3 (network layer) | LTE Long Term Evolution |
| I-WLAN | LAA Licensed Assisted | |

| | | |
|---|---|---|
| Interworking WLAN | Access LAN Local Area Network | M2M Machine-to-Machine |
| Constraint length of the convolutional code, | LBT Listen Before Talk | MAC Medium Access Control (protocol layering context) |
| USIM Individual key | LCM LifeCycle Management | MAC Message authentication code (security/encryption context) |
| kB Kilobyte (1000 bytes) | LCR Low Chip Rate | |
| kbps kilo-bits per second | LCS Location Services | |
| Kc Ciphering key | LCID Logical Channel ID | MAC-A MAC used for authentication and key agreement (TSG T WG3 context) |
| Ki Individual subscriber authentication key | LI Layer Indicator | |
| | LLC Logical Link Control, Low Layer Compatibility | |
| KPI Key Performance Indicator | | MAC-IMAC used for data integrity of signalling messages (TSG T WG3 context) |
| KQI Key Quality Indicator | LPLMN Local PLMN | |
| KSI Key Set Identifier | LPP LTE Positioning Protocol | MANO Management and Orchestration |
| ksps kilo-symbols per second | LSB Least Significant Bit | |
| KVM Kernel Virtual Machine | LTE Long Term Evolution | MBMS Multimedia Broadcast and Multicast Service |
| L1 Layer 1 (physical layer) | LWA LTE-WLAN aggregation | |
| L1-RSRP Layer 1 reference signal received power service Single Frequency Network | | MBSFN Multimedia Broadcast multicast |
| | MM Mobility Management | MSC Mobile Switching Centre |
| MCC Mobile Country Code | MME Mobility Management Entity | MSI Minimum System Information, MCH Scheduling Information |
| MCG Master Cell Group | MN Master Node | |
| MCOT Maximum Channel Occupancy Time | MnS Management Service | |
| MCS Modulation and coding scheme | MO Measurement Object, Mobile Originated | MSID Mobile Station Identifier |
| | | MSIN Mobile Station Identification Number |
| MDAF Management Data Analytics Function | MPBCH MTC Physical Broadcast CHannel | |
| MDAS Management Data Analytics Service | | MSISDN Mobile Subscriber ISDN Number |
| MDT Minimization of Drive Tests | MPDCCH MTC Physical Downlink Control CHannel | MT Mobile Terminated, Mobile Termination |
| ME Mobile Equipment | | |
| MeNB master eNB | MPDSCH MTC Physical Downlink Shared CHannel | MTC Machine-Type Communications |
| MER Message Error Ratio | | mMTCmassive MTC, massive Machine-Type Communications |
| MGL Measurement Gap Length | MPRACH MTC Physical Random Access CHannel | |
| MGRP Measurement Gap Repetition Period | | MU-MIMO Multi User MIMO |
| | MPUSCH MTC Physical Uplink Shared Channel | |
| MIB Master Information Block, Management Information Base | | MWUS MTC wake-up signal, MTC WUS |
| | MPLS MultiProtocol Label Switching | |
| MIMO Multiple Input Multiple Output | MS Mobile Station | NACK Negative Acknowledgement |
| MLC Mobile Location Centre | MSB Most Significant Bit | NAI Network Access Identifier |
| NAS Non-Access Stratum, Non- Access Stratum layer | NMS Network Management System | NRF NF Repository Function |
| | N-PoP Network Point of Presence | NRS Narrowband Reference Signal |
| NCT Network Connectivity Topology | NMIB, N-MIB Narrowband MIB | NS Network Service |
| NC-JT Non-Coherent Joint Transmission | NPBCH Narrowband Physical Broadcast CHannel | NSA Non-Standalone operation mode |
| | | NSD Network Service Descriptor |
| NEC Network Capability Exposure | NPDCCH Narrowband Physical Downlink Control CHannel | NSR Network Service Record |
| NE-DC NR-E-UTRA Dual Connectivity | | NSSAINetwork Slice Selection Assistance Information |
| | NPDSCH Narrowband Physical Downlink Shared CHannel | |
| NEF Network Exposure Function | | S-NNSAI Single-NSSAI |
| NF Network Function | NPRACH Narrowband Physical Random Access CHannel | NSSF Network Slice Selection Function |
| NFP Network Forwarding Path | | |
| NFPD Network Forwarding Path Descriptor | NPUSCH Narrowband Physical Uplink Shared CHannel | NW Network NWUSNarrowband wake-up signal, Narrowband WUS |
| NFV Network Functions Virtualization | NPSS Narrowband Primary | NZP Non-Zero Power |

| | | |
|---|---|---|
| NFVI NFV Infrastructure | Synchronization | O&M Operation and |
| NFVO NFV Orchestrator | Signal | Maintenance |
| NG Next Generation, Next Gen | NSSS Narrowband Secondary | ODU2 Optical channel Data Unit - type 2 |
| NGEN-DC NG-RAN E-UTRA-NR Dual Connectivity | Synchronization Signal NR New Radio, | OFDM Orthogonal Frequency Division Multiplexing |
| NM Network Manager | Neighbour Relation | |
| OFDMA Orthogonal Frequency Division | PCF Policy Control Function | PLMN Public Land Mobile Network |
| Multiple Access | PCRF Policy Control and | PIN Personal |
| OOB Out-of-band | Charging Rules | Identification Number |
| OOS Out of Sync | Function | PM Performance |
| OPEX OPerating EXpense | PDCP Packet Data | Measurement |
| OSI Other System Information | Convergence Protocol, Packet Data | PMI Precoding Matrix Indicator |
| OSS Operations Support System | Convergence Protocol layer | PNF Physical Network Function |
| OTA over-the-air | PDCCH Physical | PNFD Physical Network |
| PAPR Peak-to-Average Power Ratio | Downlink Control Channel | Function Descriptor PNFR Physical Network |
| PAR Peak to Average Ratio | PDCP Packet Data Convergence Protocol | Function Record POC PTT over Cellular |
| PBCH Physical Broadcast Channel | PDN Packet Data Network, Public Data | PP, PTP Point-to-Point |
| PC Power Control, Personal Computer | Network PDSCH Physical | PPP Point-to-Point Protocol |
| PCC Primary Component Carrier, | Downlink Shared Channel | PRACH Physical RACH |
| Primary CC | PDU Protocol Data Unit | PRB Physical resource |
| PCell Primary Cell | PEI Permanent | block |
| PCI Physical Cell ID, Physical Cell | Equipment Identifiers PFD Packet Flow | PRG Physical resource block group |
| Identity | Description | ProSe Proximity Services, |
| PCEF Policy and Charging Enforcement Function | P-GW PDN Gateway PHICH Physical hybrid-ARQ indicator channel PHY Physical layer | Proximity-Based Service PRS Positioning Reference Signal |
| PRR Packet Reception Radio | PUSCH Physical Uplink Shared | RAR Random Access Response |
| PS Packet Services | Channel | RAT Radio Access |
| PSBCH Physical Sidelink Broadcast Channel | QAM Quadrature Amplitude Modulation QCI QoS class of | Technology RAU Routing Area Update |
| PSDCH Physical | identifier | RB Resource block, |
| Sidelink Downlink Channel | QCL Quasi co-location QFI QoS Flow ID, QoS | Radio Bearer RBG Resource block |
| PSCCH Physical Sidelink Control Channel | Flow Identifier QoS Quality of Service QPSK Quadrature | group REG Resource Element Group |
| PSFCH Physical Sidelink Feedback Channel | (Quaternary) Phase Shift Keying QZSS Quasi-Zenith | Rel Release REQ REQuest RF Radio Frequency |
| PSSCH Physical Sidelink Shared Channel | Satellite System RA-RNTI Random Access RNTI | RI Rank Indicator RIV Resource indicator value |
| PSCell Primary SCell | RAB Radio Access | RL Radio Link |
| PSS Primary Synchronization Signal | Bearer, Random Access Burst RACH Random Access | RLC Radio Link Control, Radio Link Control layer |
| PSTN Public Switched Telephone Network | Channel RADIUS Remote | RLC AM RLC Acknowledged Mode |
| PT-RS Phase-tracking reference signal | Authentication Dial In User Service | RLC UM RLC Unacknowledged Mode |
| PTT Push-to-Talk | RAN Radio Access | RLF Radio Link Failure |
| PUCCH Physical Uplink Control Channel | Network RAND RANDom number (used for authentication) | RLM Radio Link Monitoring RLM-RSReference Signal for RLM |
| RM Registration Management | RTP Real Time Protocol RTS Ready-To-Send | SCell Secondary Cell SC-FDMA Single |
| RMC Reference Measurement Channel | RTT Round Trip Time Rx Reception, | Carrier Frequency Division Multiple |
| RMSI Remaining MSI, Remaining Minimum System Information | Receiving, Receiver S1AP S1 Application Protocol | Access SCG Secondary Cell Group |
| RN Relay Node RNC Radio Network | S1-MME S1 for the control plane | SCM Security Context Management |

| | | |
|---|---|---|
| Controller | S1-U S1 for the user | SCS Subcarrier Spacing |
| RNL Radio Network | plane | SCTP Stream Control |
| Layer | S-GW Serving Gateway | Transmission |
| RNTI Radio Network | S-RNTI SRNC | Protocol |
| Temporary Identifier | Radio Network | SDAP Service Data |
| ROHC RObust Header | Temporary Identity | Adaptation Protocol, |
| Compression | S-TMSI SAE | Service Data Adaptation |
| RRC Radio Resource | Temporary Mobile | Protocol layer |
| Control, Radio | Station Identifier | SDL Supplementary |
| Resource Control layer | SA Standalone | Downlink |
| RRM Radio Resource | operation mode | SDNF Structured Data |
| Management | SAE System | Storage Network |
| RS Reference Signal | Architecture Evolution | Function |
| RSRP Reference Signal | SAP Service Access | SDP Session Description |
| Received Power | Point | Protocol |
| RSRQ Reference Signal | SAPD Service Access | SDSF Structured Data |
| Received Quality | Point Descriptor | Storage Function |
| RSSI Received Signal | SAPI Service Access | SDU Service Data Unit |
| Strength Indicator | Point Identifier | SEAF Security Anchor |
| RSU Road Side Unit | SCC Secondary | Function |
| RSTD Reference Signal | Component Carrier, | SeNB secondary eNB |
| Time difference | Secondary CC | |
| SEPP Security Edge | SMF Session | SS-RSRP |
| Protection Proxy | Management Function | Synchronization |
| SFI Slot format | SMS Short Message | Signal based Reference |
| indication | Service | Signal Received |
| SFTD Space-Frequency | SMSF SMS Function | Power |
| Time Diversity, SFN and | SMTC SSB-based | SS-RSRQ |
| frame timing difference | Measurement Timing | Synchronization |
| SFN System Frame | Configuration | Signal based Reference |
| Number or | SN Secondary Node, | Signal Received |
| Single Frequency | Sequence Number | Quality |
| Network | SoC System on Chip | SS-SINR |
| SgNB Secondary gNB | SON Self-Organizing | Synchronization |
| SGSN Serving GPRS | Network | Signal based Signal to |
| Support Node | SpCell Special Cell | Noise and Interference |
| S-GW Serving Gateway | SP-CSI-RNTISemi- | Ratio |
| SI System Information | Persistent CSI RNTI | SSS Secondary |
| SI-RNTI System | SPS Semi-Persistent | Synchronization |
| Information RNTI | Scheduling | Signal |
| SIB System Information | SQN Sequence number | SSSG Search Space Set |
| Block | SR Scheduling Request | Group |
| SIM Subscriber Identity | SRB Signalling Radio | SSSIF Search Space Set |
| Module | Bearer | Indicator |
| SIP Session Initiated | SRS Sounding | SST Slice/Service Types |
| Protocol | Reference Signal | SU-MIMO Single User |
| SiP System in Package | SS Synchronization | MIMO |
| SL Sidelink | Signal | SUL Supplementary |
| SLA Service Level | SSB SS Block | Uplink |
| Agreement | SSBRI SSB Resource | TA Timing Advance, |
| SM Session | Indicator | Tracking Area |
| Management | SSC Session and Service | TAC Tracking Area |
| | Continuity | Code |
| TAG Timing Advance | TPMI Transmitted | UDP User Datagram |
| Group | Precoding Matrix | Protocol |
| TAU Tracking Area | Indicator | UDR Unified Data |
| Update | TR Technical Report | Repository |
| TB Transport Block | TRP, TRxP | UDSF Unstructured Data |
| TBS Transport Block | Transmission | Storage Network |
| Size | Reception Point | Function |
| TBD To Be Defined | TRS Tracking Reference | UICC Universal |
| TCI Transmission | Signal | Integrated Circuit Card |
| Configuration Indicator | TRx Transceiver | UL Uplink |
| TCP Transmission | TS Technical | UM Unacknowledged |
| Communication | Specifications, | Mode |
| Protocol | Technical Standard | UML Unified Modelling |
| TDD Time Division | TTI Transmission Time | Language |
| Duplex | Interval | UMTS Universal Mobile |
| TDM Time Division | Tx Transmission, | Telecommunications |
| Multiplexing | Transmitting, | System |
| TDMATime Division | Transmitter | UP User Plane |
| Multiple Access | U-RNTI UTRAN | UPF User Plane |
| TE Terminal | Radio Network | Function |
| Equipment | Temporary Identity | URI Uniform Resource |
| TEID Tunnel End Point | UART Universal | Identifier |
| Identifier | Asynchronous | URL Uniform Resource |
| TFT Traffic Flow | Receiver and | Locator |
| Template | Transmitter | URLLC Ultra- |
| TMSI Temporary Mobile | UCI Uplink Control | Reliable and Low |

| | | |
|---|---|---|
| Subscriber Identity | Information | Latency |
| TNL Transport Network Layer | UE User Equipment UDM Unified Data Management | USB Universal Serial Bus USIM Universal Subscriber Identity Module |
| TPC Transmit Power Control | | |
| USS UE-specific search space | VLAN Virtual LAN, Virtual Local Area Network | VRB Virtual Resource Block |
| UTRA UMTS Terrestrial Radio Access | VM Virtual Machine | WiMAX Worldwide Interoperability for Microwave Access |
| UTRAN Universal Terrestrial Radio Access Network | VNF Virtualized Network Function VNFFG VNF Forwarding Graph | WLANWireless Local Area Network |
| UwPTS Uplink Pilot Time Slot | VNFFGD VNF Forwarding Graph Descriptor | WMAN Wireless Metropolitan Area Network |
| V2I Vehicle-to-Infrastructure | | WPANWireless Personal Area Network |
| V2P Vehicle-to-Pedestrian | VNFMVNF Manager VoIP Voice-over-IP, Voice-over- Internet Protocol | X2-C X2-Control plane X2-U X2-User plane |
| V2V Vehicle-to-Vehicle | | |
| V2X Vehicle-to-everything | VPLMN Visited Public Land Mobile Network | XML extensible Markup Language XRES EXpected user RESponse XOR exclusive OR ZC Zadoff-Chu ZP Zero Power |
| VIM Virtualized Infrastructure Manager | | |
| VL Virtual Link, | VPN Virtual Private Network | |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary SCG Cell" refers to the SCG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the SCG for DC operation; otherwise, the term "Special Cell" refers to the Pcell.

The invention claimed is:

1. One or more non-transitory, computer-readable media (NTCRM) having instructions, stored thereon, that when executed by one or more processors cause a user equipment (UE) to:

receive a configured grant for an uplink transmission;

determine a starting time offset and a cyclic prefix (CP) extension for the uplink transmission, wherein the CP extension is determined according to:

$$T_{ext} = \kappa et \ T_{ssmb} \cdot (0 - k_y) \mod 7.2 \sim T_{offset}$$

wherein Text is the CP extension, Toffset is the starting time offset, $l$ is a first symbol allocated for the uplink transmission, and N=1/2/4 for u=0/1/2, respectively; and encode the uplink transmission based on the CP extension.

2. The one or more NTCRM of claim 1, wherein μ corresponds to a subcarrier spacing of the uplink transmission.

3. The one or more NTCRM of claim 1, wherein the instructions, when executed, are further to cause the UE to determine a value of the starting time offset based on an index.

4. The one or more NTCRM of claim 3, wherein the value of the starting time offset is determined from among a set of values that includes: 16, 25, 34, 43, 52, and 61 microseconds.

5. The one or more NTCRM of claim 4, wherein the set of values further includes $$\sum_{k=1}^{N} T^{\mu}_{symb,(l-k) \bmod 7 \cdot 2^{\mu}}$$

microseconds.

6. The one or more NTCRM of claim 1, wherein the uplink transmission is a physical uplink shared channel (PUSCH) transmission.

7. The one or more NTCRM of claim 1, wherein the configured grant is for unlicensed spectrum.

8. One or more non-transitory, computer-readable media (NTCRM) having instructions, stored thereon, that when executed by one or more processors cause a next generation Node B (gNB) to:
configure a user equipment (UE) with a configured grant for an uplink transmission;
determine a starting time offset and a cyclic prefix (CP) extension for the uplink transmission, wherein the CP extension is determined according to:

$$T_{ext} = \sum_{k=1}^{N} T^{\mu}_{symb,(l-k) \bmod 7 \cdot 2^{\mu}} - T_{offset}$$

12. The one or more NTCRM of claim 11, wherein the set of values further includes $$\sum_{k=1}^{N} T^{\mu}_{symb,(l-k) \bmod 7 \cdot 2^{\mu}}$$

microseconds.

13. The one or more NTCRM of claim 8, wherein the uplink transmission is a physical uplink shared channel (PUSCH) transmission.

14. The one or more NTCRM of claim 8, wherein the configured grant is for unlicensed spectrum.

15. One or more non-transitory, computer-readable media (NTCRM) having instructions, stored thereon, that when executed by one or more processors cause a user equipment (UE) to:
receive a downlink control information (DCI) to schedule transmission of an uplink signal;
determine a cyclic prefix (CP) extension for the transmission of the uplink signal based on an index and a value, $\mu$, that corresponds to a subcarrier spacing of the uplink signal, wherein the CP extension is determined according to:

| Index | $\mu = 0$ | $\mu = 1$ | $\mu = 2$ |
|---|---|---|---|
| 0 | — | — | — |
| 1 | $T_{symb,l}^{\mu} - 25 \cdot 10^{-6}$ | $T_{symb,l}^{\mu} - 25 \cdot 10^{-6}$ | $\sum_{k=1}^{2} T^{\mu}_{symb,mod(l-k,7 \cdot 2^{\mu})} - 25 \cdot 10^{-6}$ |
| 2 | $\sum_{k=1}^{C_2} T^{\mu}_{symb,mod(l-k,7 \cdot 2^{\mu})} - 16 \cdot 10^{-6} - T_{TA}$ | $\sum_{k=1}^{C_2} T^{\mu}_{symb,mod(l-k,7 \cdot 2^{\mu})} - 16 \cdot 10^{-6} - T_{TA}$ | $\sum_{k=1}^{C_2} T^{\mu}_{symb,mod(l-k,7 \cdot 2^{\mu})} - 16 \cdot 10^{-6} - T_{TA}$ |
| 3 | $\sum_{k=1}^{C_3} T^{\mu}_{symb,mod(l-k,7 \cdot 2^{\mu})} - 25 \cdot 10^{-6} - T_{TA}$ | $\sum_{k=1}^{C_3} T^{\mu}_{symb,mod(l-k,7 \cdot 2^{\mu})} - 25 \cdot 10^{-6} - T_{TA}$ | $\sum_{k=1}^{C_3} T^{\mu}_{symb,mod(l-k,7 \cdot 2^{\mu})} - 25 \cdot 10^{-6} - T_{TA}$ | wherein $T_{ext}$ is the CP extension, $T_{offset}$ is the starting time offset, l is a first symbol allocated for the uplink transmission, and N=1/2/4 for $\mu$=0/1/2, respectively; and
receive the uplink transmission from the UE based on the CP extension.

9. The one or more NTCRM of claim 8, wherein $\mu$ corresponds to a subcarrier spacing of the uplink transmission.

10. The one or more NTCRM of claim 8, wherein the instructions, when executed, are further to cause the gNB to determine a value of the starting time offset based on an index.

11. The one or more NTCRM of claim 10, wherein the value of the starting time offset is determined from among a set of values that includes: 16, 25, 34, 43, 52, and 61 microseconds.

wherein:
C2 and C3 are numerical values;
l is a first symbol allocated for the uplink signal; and
$T_{TA}$ is a timing advance; and
encode the uplink signal for transmission based on the determined CP extension.

16. The one or more NTCRM of claim 15, wherein the instructions, when executed, are further to cause the UE to receive a radio resource control (RRC) message to indicate the values of C2 and C3.

17. The one or more NTCRM of claim 15, wherein the instructions, when executed, are further to cause the UE to determine the value of C2 or C3 as a largest integer that fulfills $T'_{ext} < T_{symb,\ (l-1) \bmod 7 \cdot 2^{\mu}}$.

18. The one or more NTCRM of claim 17, wherein the value of C2 or C3 is determined as the largest integer that fulfills $T'_{ext} < T_{symb,\ (l-1) \bmod 7 \cdot 2^{\mu}}$ for contention-based random access or if the values of C2 and C3 are not configured for the UE.

19. The one or more NTCRM of claim 15, wherein the uplink signal is a physical uplink shared channel (PUSCH), a sounding reference signal (SRS), or a physical uplink control channel (PUCCH).

\* \* \* \* \*

UNITED STATES PATENT AND TRADEMARK OFFICE
CERTIFICATE OF CORRECTION

PATENT NO. : 11,784,861 B2  
APPLICATION NO. : 17/174184  
DATED : October 10, 2023  
INVENTOR(S) : Carlos H. Aldana et al.

Page 1 of 1

It is certified that error appears in the above-identified patent and that said Letters Patent is hereby corrected as shown below:

In the Claims

Column 48
Claim 1, Line 50, replace "$T_{oxt-ket}\ T_{ssmb}$ (0-$ky$ mod 7.2~$T_{offset}$" with
"$T_{ext} = \sum_{k=1}^{N} T^{\mu}_{symb,(l-k)\bmod 7 \cdot 2^{\mu}} - T_{offset}$"

Column 50
Claim 17, Line 62, replace "$T'_{ext} < T_{symb,\ (l-1)\bmod 7 \cdot 2^{\mu}}$" with
"$T'_{ext} < T^{\mu}_{symb,\ (l-1)\bmod 7 \cdot 2^{\mu}}$"

Column 50
Claim 18, Line 65, replace "$T'_{ext} < T_{symb,\ (l-1)\bmod 7 \cdot 2^{\mu}}$" with
"$T'_{ext} < T^{\mu}_{symb,\ (l-1)\bmod 7 \cdot 2^{\mu}}$"

Signed and Sealed this  
First Day of October, 2024

Katherine Kelly Vidal  
*Director of the United States Patent and Trademark Office*